United States Patent
Tanaka et al.

(10) Patent No.: US 9,477,327 B2
(45) Date of Patent: Oct. 25, 2016

(54) DISPLAY DEVICE AND DISPLAY CONTROL SYSTEM

(71) Applicant: PANASONIC CORPORATION, Osaka (JP)

(72) Inventors: Yasuhiro Tanaka, Hyogo (JP); Kazuhiro Yamada, Oaska (JP); Kenji Hasegawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 17 days.

(21) Appl. No.: 14/309,080

(22) Filed: Jun. 19, 2014

(65) Prior Publication Data

US 2014/0300589 A1    Oct. 9, 2014

Related U.S. Application Data

(63) Continuation of application No. PCT/JP2013/000858, filed on Feb. 15, 2013.

(30) Foreign Application Priority Data

Feb. 17, 2012  (JP) ................................. 2012-032326

(51) Int. Cl.
*G06F 3/03* (2006.01)
*G06F 3/0354* (2013.01)
(Continued)

(52) U.S. Cl.
CPC ......... *G06F 3/03545* (2013.01); *G06F 3/0321* (2013.01); *G06F 3/0386* (2013.01); *G06F 3/03542* (2013.01); *G06F 3/042* (2013.01)

(58) Field of Classification Search
CPC .. G06F 3/0317; G06F 3/0321; G06F 3/0386; G06F 3/03542; G06F 3/03545; G06F 3/03546

See application file for complete search history.

(56) References Cited

U.S. PATENT DOCUMENTS 6,597,427 B1 * 7/2003 Katsu .................. G02F 1/13338
349/192
2002/0046887 A1    4/2002 Yanagisawa et al.
(Continued)

FOREIGN PATENT DOCUMENTS

JP    2002-196875 A    7/2002
JP    2003-256137 A    9/2003
(Continued)

OTHER PUBLICATIONS

English translation of International Search Report issued in PCT/JP2013/000858, dated May 21, 2013.

*Primary Examiner* — Alexander Eisen
*Assistant Examiner* — Cory Almeida
(74) *Attorney, Agent, or Firm* — McDermott Will & Emery LLP

(57) ABSTRACT

A display device having a display surface includes a plurality of black lines defining a plurality of pixels; and a plurality of information patterns arranged so as to overlap the display surface and each representing information regarding a position thereof on the display surface. Each information pattern is formed by using a plurality of marks provided so as to overlap the pixels, and each mark is formed from a material that transmits visible light and absorbs or diffusedly reflects infrared light. A length of each mark in a width direction of the thickest black lines among the black lines defining the pixel overlapped by the mark is larger than a width of each thickest black line.

13 Claims, 17 Drawing Sheets

(51) Int. Cl.
*G06F 3/038* (2013.01)
*G06F 3/042* (2006.01)

(56) References Cited

U.S. PATENT DOCUMENTS

| | | | |
|---|---|---|---|
| 2004/0095337 A1 | 5/2004 | Pettersson et al. | |
| 2004/0113898 A1 | 6/2004 | Pettersson et al. | |
| 2005/0104861 A9 | 5/2005 | Pettersson et al. | |
| 2006/0076416 A1 | 4/2006 | Pettersson | |
| 2007/0003150 A1* | 1/2007 | Xu | G06F 3/03545 382/237 |
| 2008/0252606 A1* | 10/2008 | Gillies | G06F 3/03545 345/173 |
| 2009/0015548 A1* | 1/2009 | Tazaki | G06F 3/0308 345/156 |
| 2010/0096458 A1 | 4/2010 | Pettersson et al. | |
| 2011/0109641 A1 | 5/2011 | Yoshida | |
| 2012/0193419 A1 | 8/2012 | Pettersson et al. | |
| 2013/0113758 A1* | 5/2013 | Choi | G06F 3/0425 345/175 |

FOREIGN PATENT DOCUMENTS

| | | |
|---|---|---|
| JP | 2006-127081 A | 5/2006 |
| JP | 2006-141061 A | 6/2006 |
| JP | 2007-226577 A | 9/2007 |
| JP | 2007-536670 A | 12/2007 |
| JP | 2009-043218 A | 2/2009 |
| JP | 2009-245366 A | 10/2009 |
| WO | 2005-106638 A2 | 11/2005 |

\* cited by examiner

DISPLAY DEVICE AND DISPLAY CONTROL SYSTEM

RELATED APPLICATIONS

This application is a continuation of International Application No. PCT/JP2013/000858, filed on Feb. 15, 2013, which in turn claims the benefit of Japanese Application No. 2012-032326, filed on Feb. 17, 2012, the disclosures of which Applications are incorporated by reference herein.

BACKGROUND

1. Field

The present disclosure relates to a display device that enables a handwriting input on a display surface of a digital display.

2. Description of the Related Art

A technology has been known in which when characters or the like are written on paper with a pen, the information written on the paper is computerized and transmitted to a server or a terminal.

Such a technology is described in Japanese Laid-Open Patent Publication No. 2007-226577.

SUMMARY

Meanwhile, in recent years, a system has been developed in which a handwriting input is enabled on a display surface of a digital display using a digital pen.

The present disclosure provides a display device and a display control system that are effective for improving the accuracy of reading, by a reading device such as a digital pen, an information pattern for identifying a position on a display surface.

A display device according to the present disclosure that attains the above-described object is a display device having a display surface on which an image is displayed. The display device includes: a plurality of black lines defining a plurality of pixels for forming a display image to be displayed on the display surface; a plurality of information patterns arranged so as to overlap the display surface and each representing information regarding a position thereof on the display surface. Each information pattern is formed by using a plurality of marks provided so as to overlap the pixels. Each mark is formed from a material that transmits visible light and absorbs or diffusedly reflects infrared light. A length of each mark in a width direction of a thickest black line among the black lines defining the pixel overlapped by the mark is larger than a width of the thickest black line.

The display device according to the present disclosure is effective for improving the accuracy of reading the information pattern by the reading device.

Figure 6:
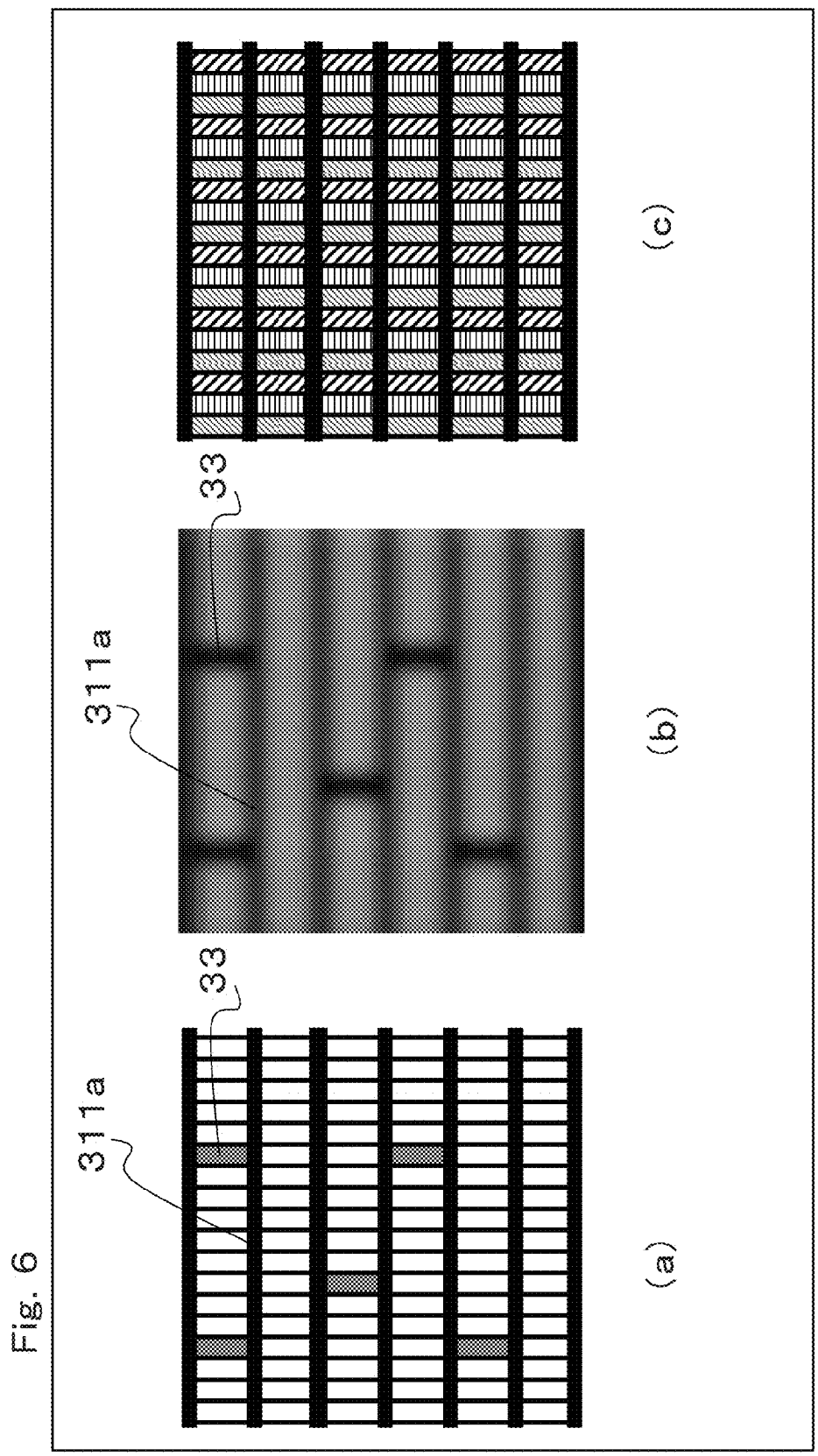
Figure 7:
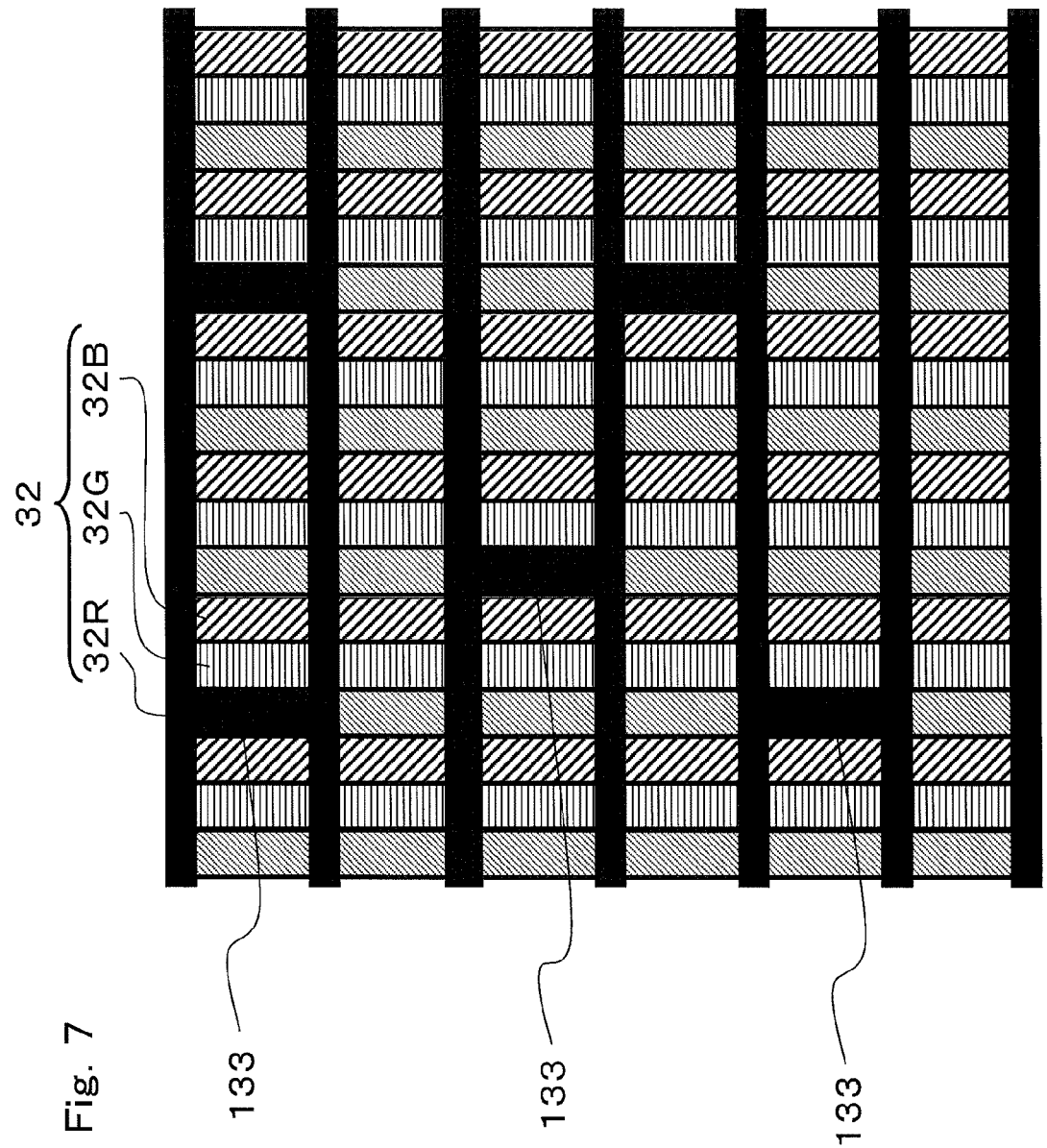
Figure 8:
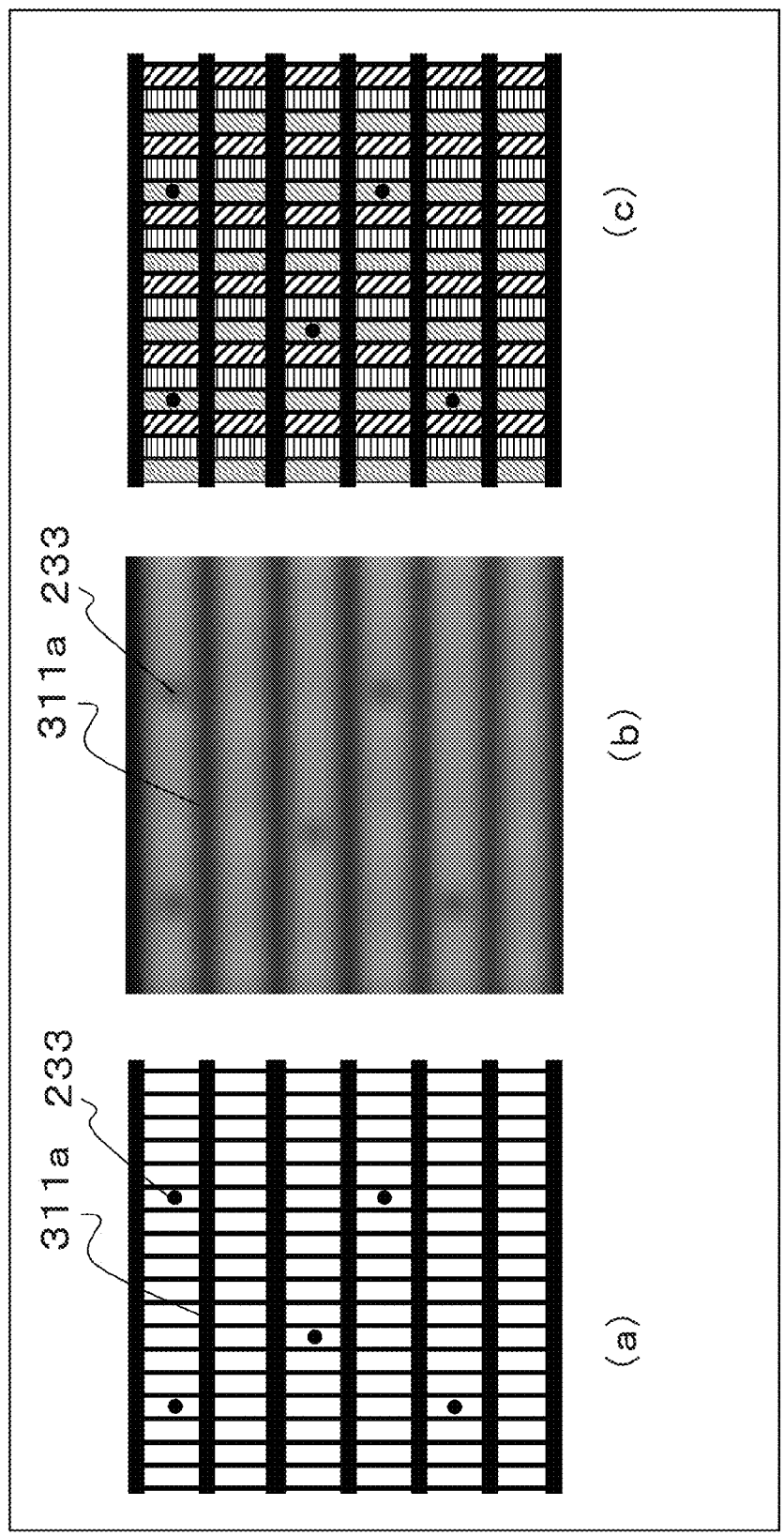
Figure 9:
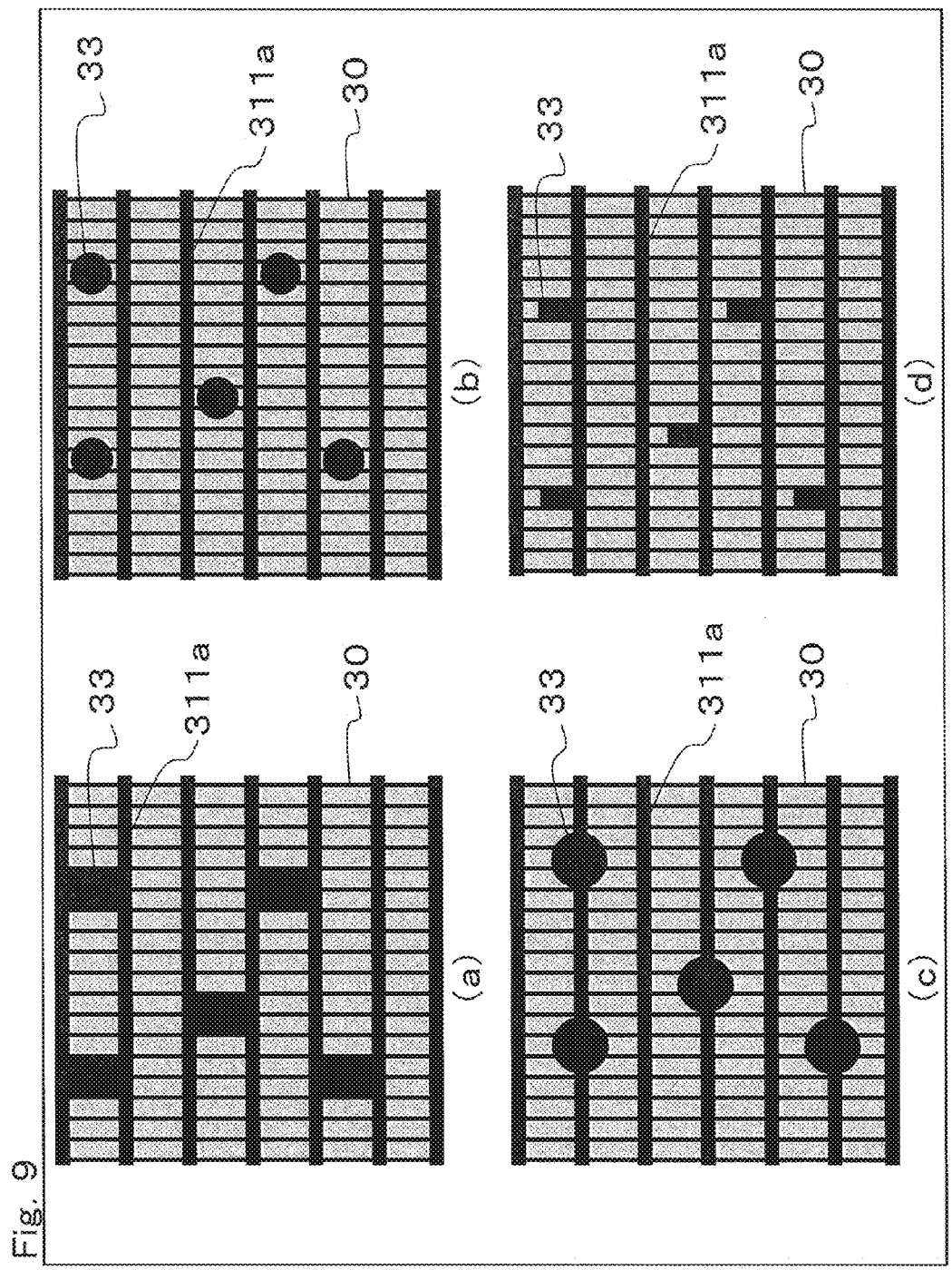
Figure 10:
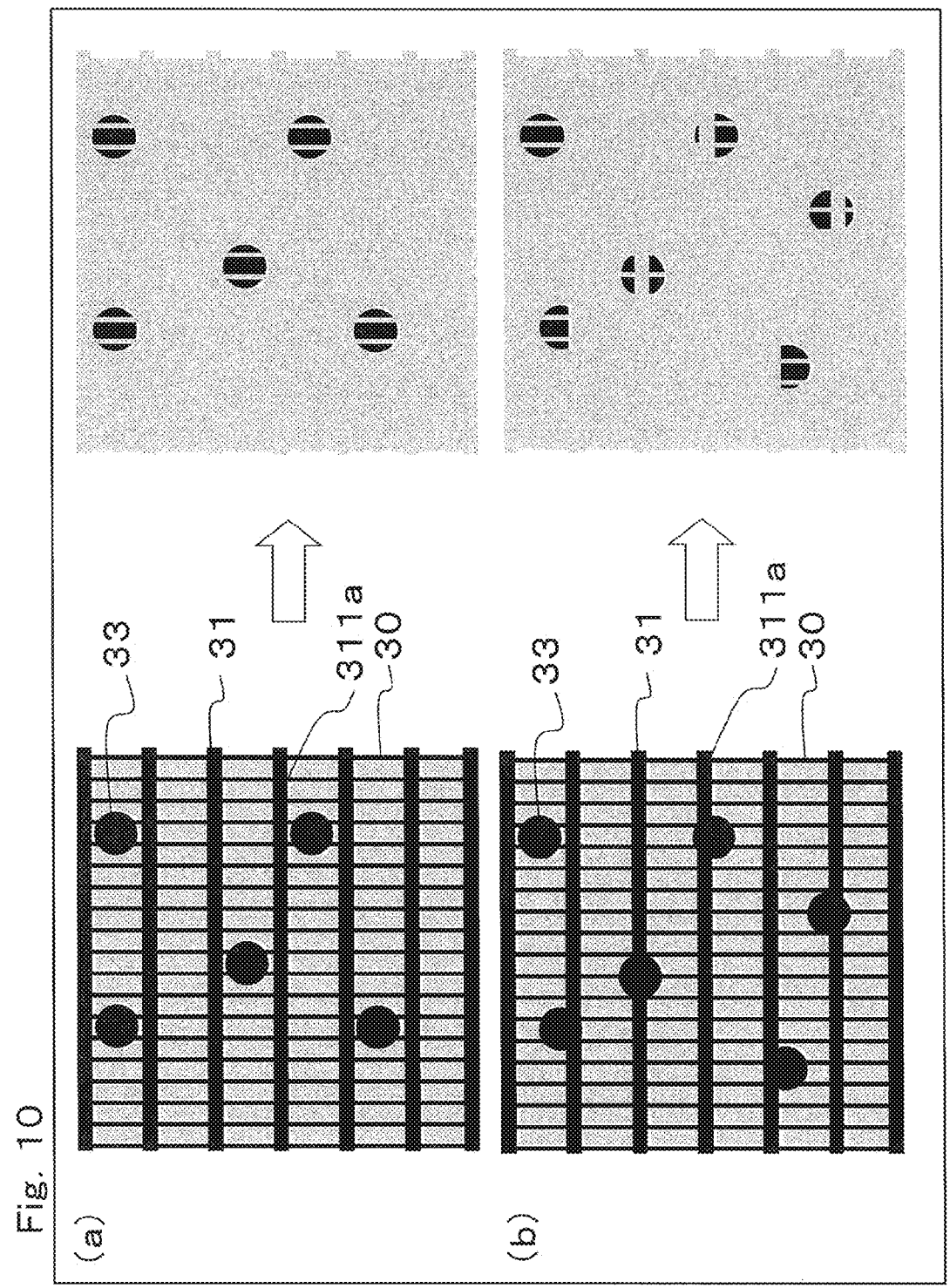
Figure 11:
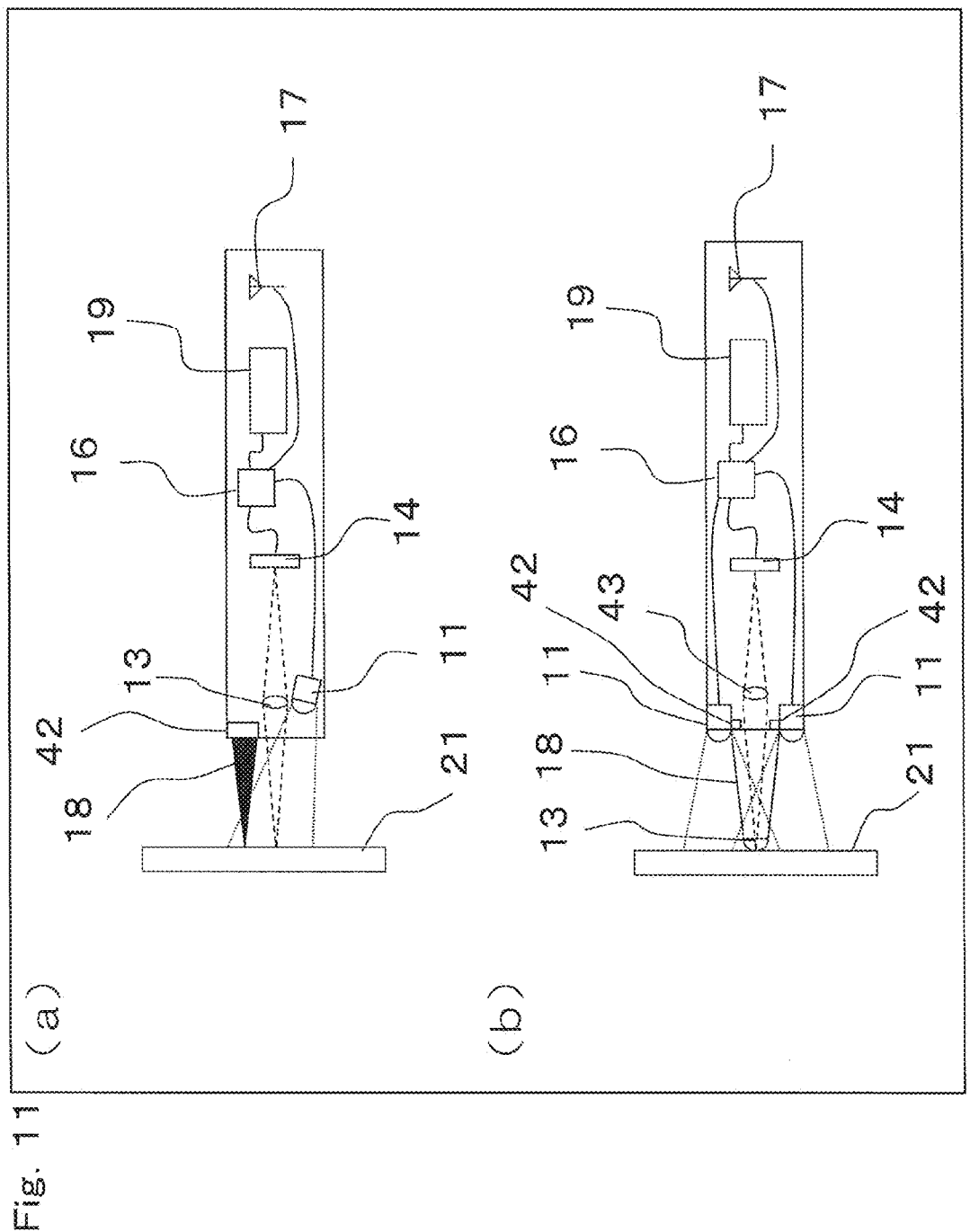
Figure 12:
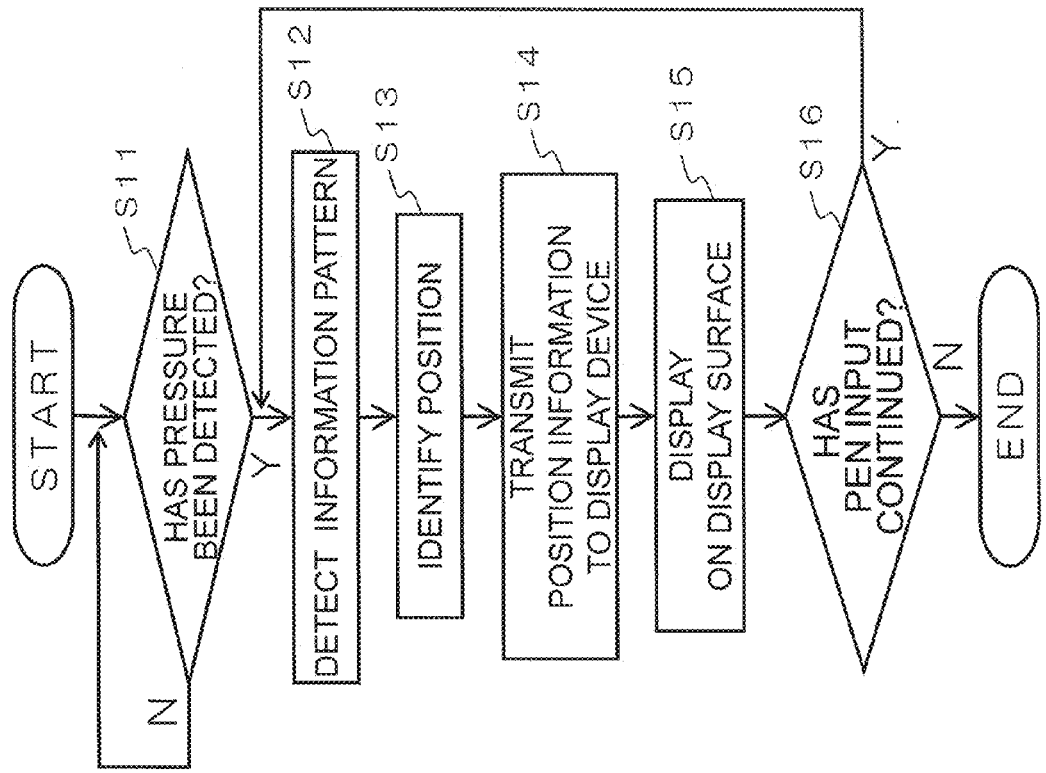
Figure 13:
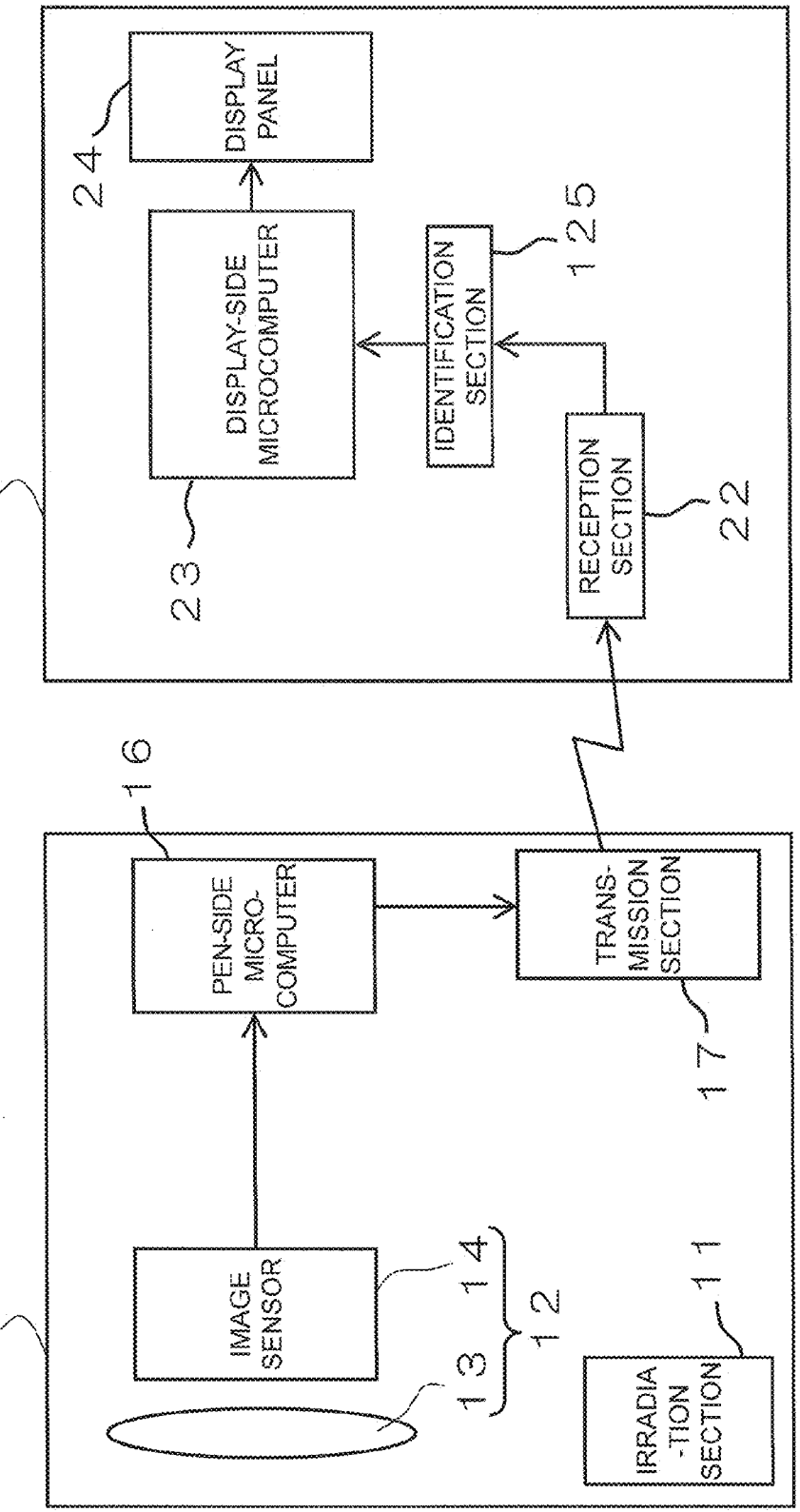
Figure 14:
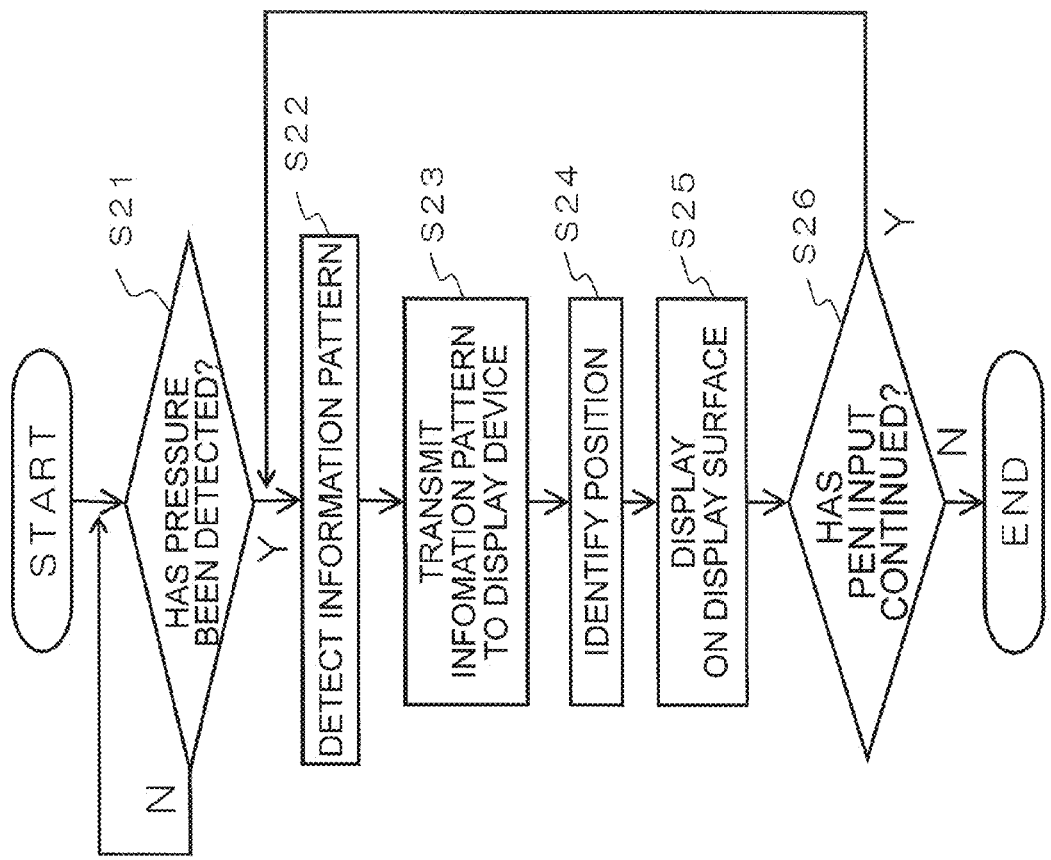
Figure 15:
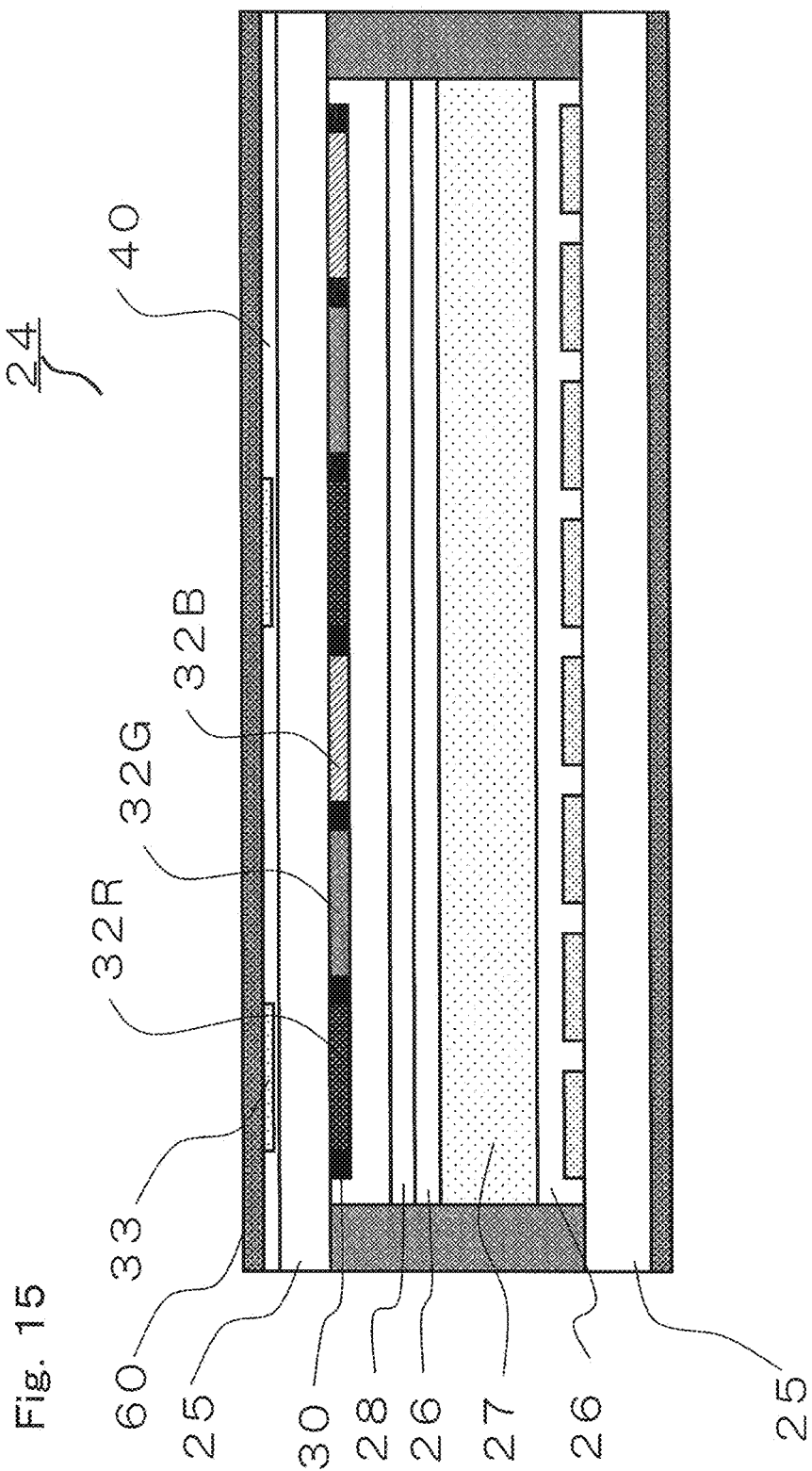
Figure 16:
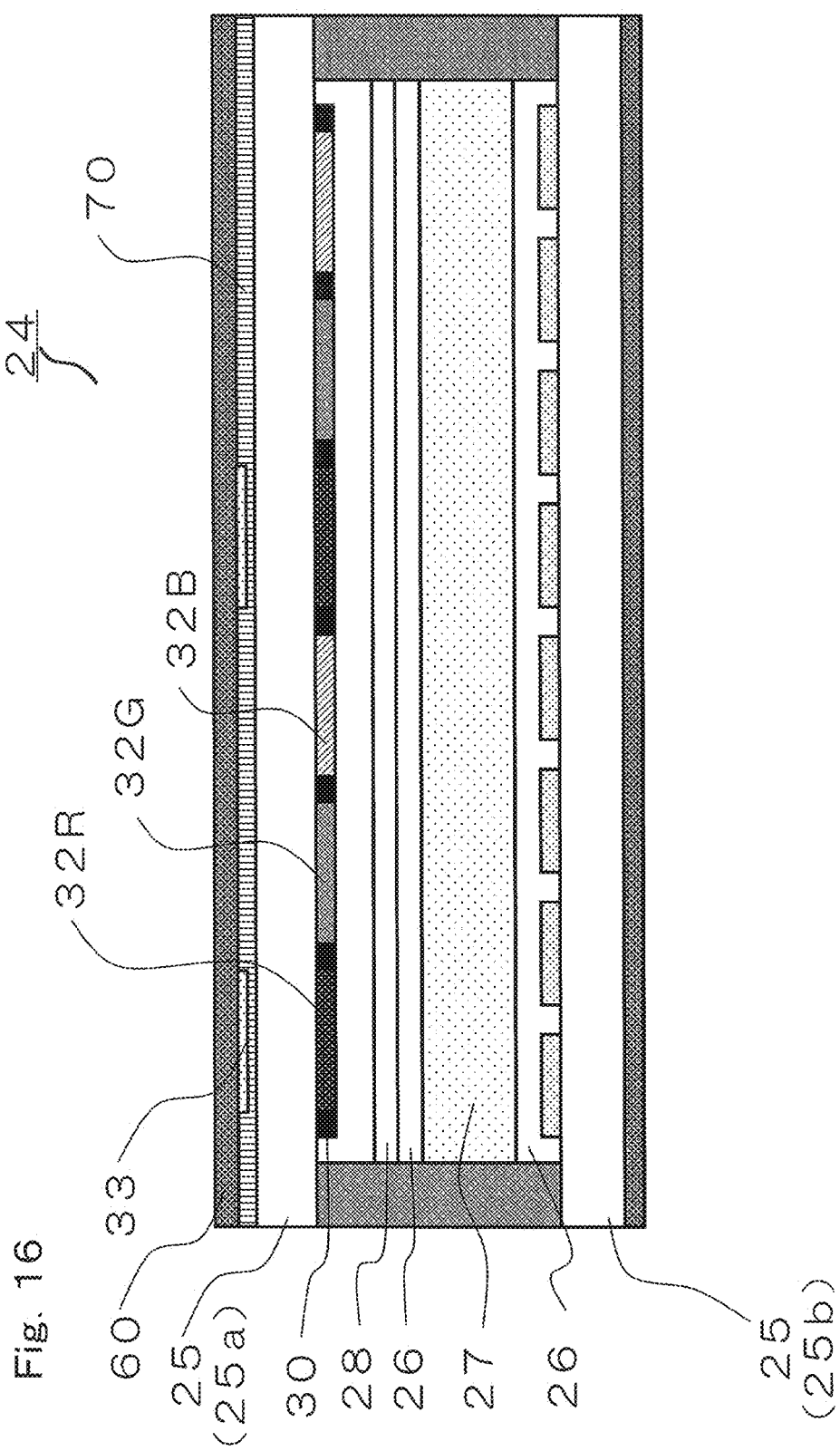
Figure 17:
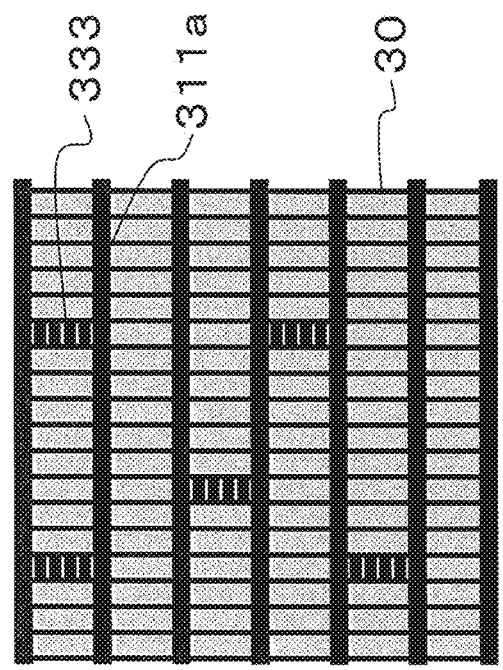

(a) of FIG. 6 is a schematic diagram of an infrared image of the color filter 30 on which marks 33 are formed, (b) of FIG. 6 is an infrared image generated when an information pattern is read by a digital pen 10, and (c) of FIG. 6 is a schematic diagram of a visible image of the color filter 30 through which red light, green light, and blue light have passed;

FIG. 7 is a schematic diagram of a visible image of the color filter 30 having transmitted visible light, in the case where each mark 133 is formed from a material that does not transmit visible light;

(a) of FIG. 8 is a schematic diagram of an infrared image of a color filter on which dots are formed, (b) of FIG. 8 is an infrared image generated when an information pattern is read by the digital pen 10, and (c) of FIG. 8 is a schematic diagram of a visible image of the color filter through which red light, green light, and blue light have passed;

FIG. 9 illustrates modifications of the marks 33;

(a) of FIG. 10 is a diagram schematically showing a state where a black matrix component is removed from an infrared image of the color filter 30 on which the marks 33 are regularly arranged, and (b) of FIG. 10 is a diagram schematically showing a state where a black matrix component is removed from an infrared image of the color filter 30 on which the marks 33 are randomly arranged;

FIG. 11 is a schematic configuration diagram of the digital pen 10;

FIG. 12 is a flowchart showing flow of a process of the display control system 100;

FIG. 13 is a block diagram of a display control system 200;

FIG. 14 is a flowchart showing flow of a process of the display control system 200;

FIG. 15 is a cross-sectional view of a modification of the display panel 24;

FIG. 16 is a cross-sectional view of another modification of the display panel 24; and FIG. 17 is a cross-sectional view of still another modification of the display panel 24.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

Embodiment 1

1. Display Control System

Figure 1:
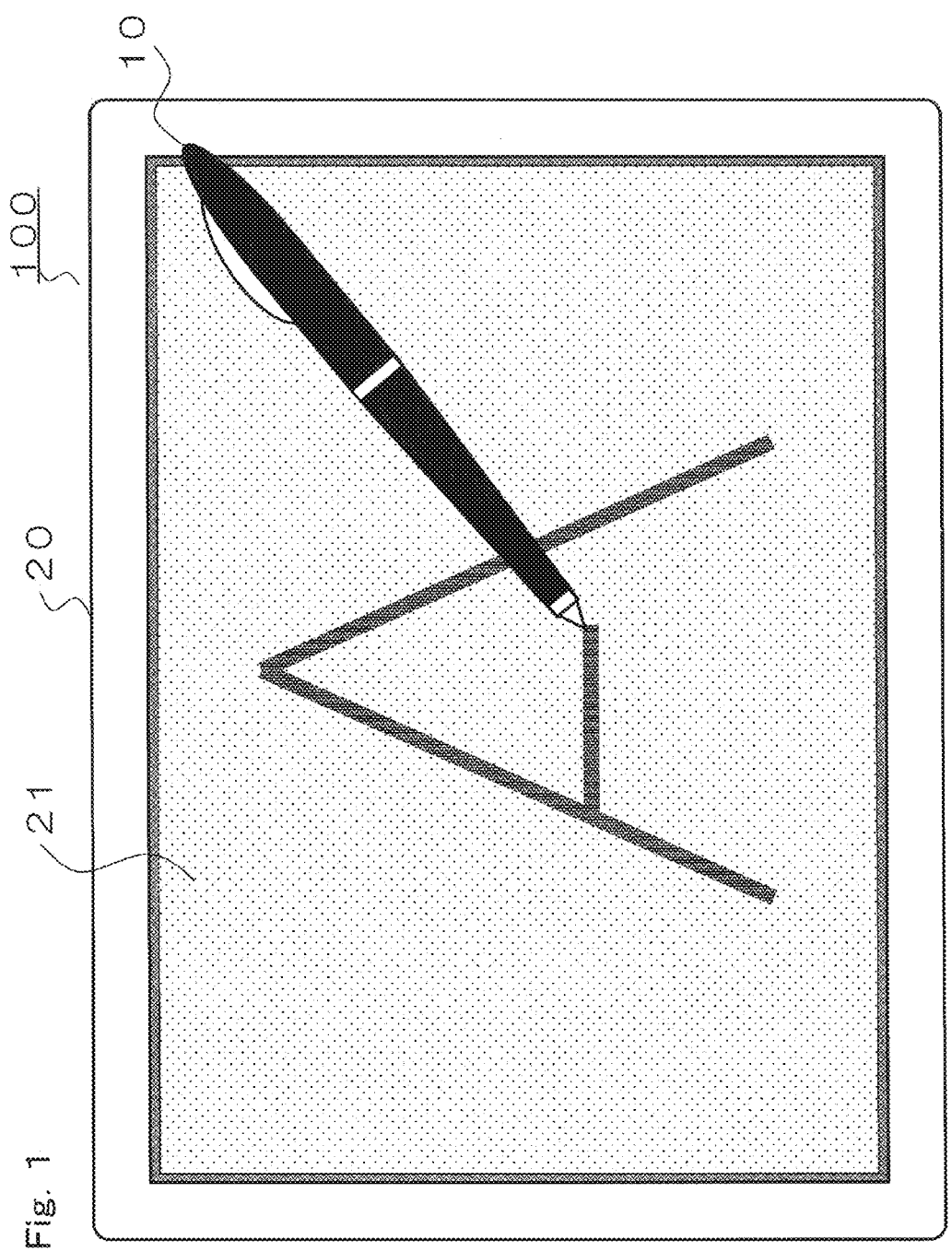
FIG. 1 is a schematic diagram showing a situation where a user uses a display control system 100.

FIG. 1 shows a scene in which a user is inputting a character on a display surface 21 of a display device 20 by using an optical digital pen 10. It should be noted that in FIG. 1, the scene in which the character is inputted taken as an example, but what is capable of being inputted on the display surface 21 is not limited to characters (numbers, characters in English and Japanese, etc.). Symbols, figures, and the like are capable of being inputted.

A display control system 100 (display control apparatus) according to the present embodiment includes the optical digital pen (hereinafter, referred to as "digital pen") 10 and the display device 20. The digital pen 10 is used as a data input device of the display control system 100. When the user writes a character on the display surface 21 with the digital pen 10, the inputted character is displayed on the display surface 21.

A plurality of information patterns that are different depending a position (display position) on the display surface 21 are previously formed on the display surface 21. Each information pattern represents information regarding a position on the display surface 21 corresponding to its arranged position. Each information pattern is a pattern for identifying the position of an input performed with an external device such as the digital pen 10 for writing information on the display surface 21. The details of the information patterns will be described later. The digital pen 10 is able to read the information pattern to identify, as position information, a position (e.g., a coordinate) on the display surface 21 corresponding to the information pattern, thereby identifying the position at which the user performs writing on the display surface 21. In other words, the digital pen 10 also serves as a reading device that reads the information pattern.

The digital pen 10 is able to continuously identify position information from read information patterns, thereby detecting a trajectory of the pen tip of the digital pen 10, namely, handwriting of a character or the like written by the user. The position information identified thus is transmitted to the display device 20. On the basis of the position information, the display device 20 changes display information to be displayed on the display surface 21, such that information such as a character written with the digital pen 10 is displayed on the display surface 21. Therefore, the user is allowed to write a character and the like on the display surface 21 with the digital pen 10 as if writing a character and the like on paper with a pen.

In addition, it is also possible to delete an inputted character by using the digital pen 10. In other words, the user is also allowed to use the digital pen 10 as a data input device that deletes a written character and the like, like an eraser. In this case as well, similarly to the case of writing a character, the information pattern is read by the digital pen 10, thereby identifying the position of the pen tip of the digital pen 10. Then, on the basis of identified position information, the display information to be displayed on the display surface 21 is changed such that the information written with the digital pen 10 is deleted from the display surface 21.

2. Digital Pen and Display Device

Figure 2:
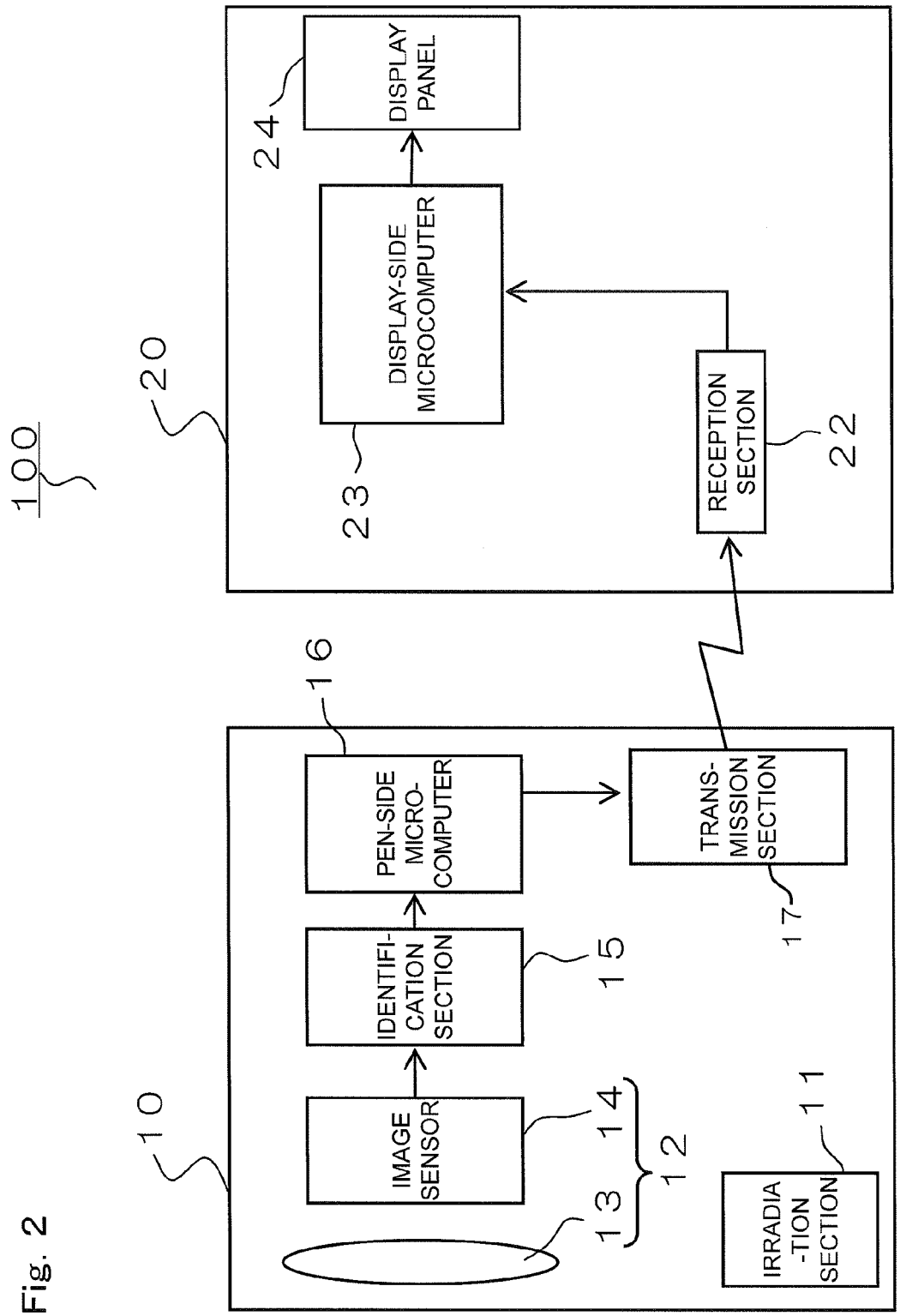
FIG. 2 is a block diagram of the display control system 100.

FIG. 2 is a block diagram showing the configurations of the digital pen 10 and the display device 20.

First, the digital pen 10 will be described.

As shown in FIG. 2, the digital pen 10 includes an irradiation section 11, a reading section 12, an identification section 15, a pen-side microcomputer 16, and a transmission section 17.

The irradiation section 11 emits infrared light to the information patterns formed on the display surface 21. The wavelength of the infrared light is preferably equal to or longer than 850 nm. Although details will be described later, each information pattern is formed from a component whose transmittance for infrared light is, for example, equal to or lower than 50% and which absorbs infrared light. Thus, much of the infrared light emitted from the irradiation section 11 is absorbed by the information patterns and cannot pass therethrough. In addition, much of the infrared light emitted from the irradiation section 11 passes through a region other than the information patterns and is reflected on a reflection surface of a later-described backlight device.

The reading section 12 includes an objective lens 13 and an image sensor 14. The reading section 12 is able to optically read the information pattern. The infrared light that is partially absorbed by the information pattern but passes through the other region and is reflected on the above reflection surface is received by the image sensor 14 through the objective lens 13. The received infrared light forms an optical image of the information pattern on an imaging surface of the image sensor 14. In this manner, the information pattern is read by the reading section 12. For example, a CCD image sensor or a CMOS image sensor may be used as the image sensor 14. Imaging data of the information pattern read by the reading section 12 is sent to the identification section 15.

On the basis of the information pattern read by the reading section 12 (the imaging data outputted by the image sensor 14), the identification section 15 identifies the position at which the information pattern is formed, as a position on the display surface 21. The information patterns are formed so as to be different from each other depending on a position on the display surface 21. Thus, the identification section 15 is able to identify at which position on the display surface 21 the pen tip of the digital pen 10 is located, by referring to change of the information pattern read by the reading section 12. Information (position information) representing the position on the display surface 21 that is identified by the identification section 15 is sent to the pen-side microcomputer 16.

The pen-side microcomputer 16 is composed of a CPU, a memory, and the like. The pen-side microcomputer 16 is provided with a program for causing the CPU to operate. The pen-side microcomputer 16 controls the entirety of the digital pen 10. The pen-side microcomputer 16 is an example of a control section.

The transmission section 17 transmits, to the display device 20, the information representing the position on the display surface 21 that is identified by the identification section 15.

3. Display Device

Next, the display device 20 will be described with reference to FIGS. 2 and 3.

As shown in FIG. 2, the display device 20 includes a reception section 22, a display-side microcomputer 23, and a display panel 24. The display device 20 according to the present embodiment is a liquid crystal display. The display panel 24 is an example of a display section. Although illustration is omitted, the display device 20 also includes, for example, a backlight device that emits light to the display panel 24 from a back side of the display panel 24.

The reception section 22 receives information transmitted from the transmission section 17 of the digital pen 10. The received information includes the information representing the position on the display surface 21 that is identified by the identification section 15 of the digital pen 10. The information (position information, etc.) received by the reception section 22 is sent to the display-side microcomputer 23.

The display-side microcomputer 23 is composed of a CPU, a memory, and the like. The display-side microcomputer 23 is provided with a program for causing the CPU to operate. The display-side microcomputer 23 controls the entirety of the display device 20. The display-side microcomputer 23 is an example of a control section.

The display-side microcomputer 23 controls the display panel 24 so as to change the display information to be displayed on the display surface 21, in accordance with the position on the display surface 21 that is identified by the identification section 15 of the digital pen 10. Specifically, the display-side microcomputer 23 controls the display panel 24 such that the position on the display surface 21 that is identified by the identification section 15 comes into a state where writing with the digital pen 10 has been performed. Thus, a character inputted by the user with the digital pen 10 is displayed on the display surface 21.

Figure 3:
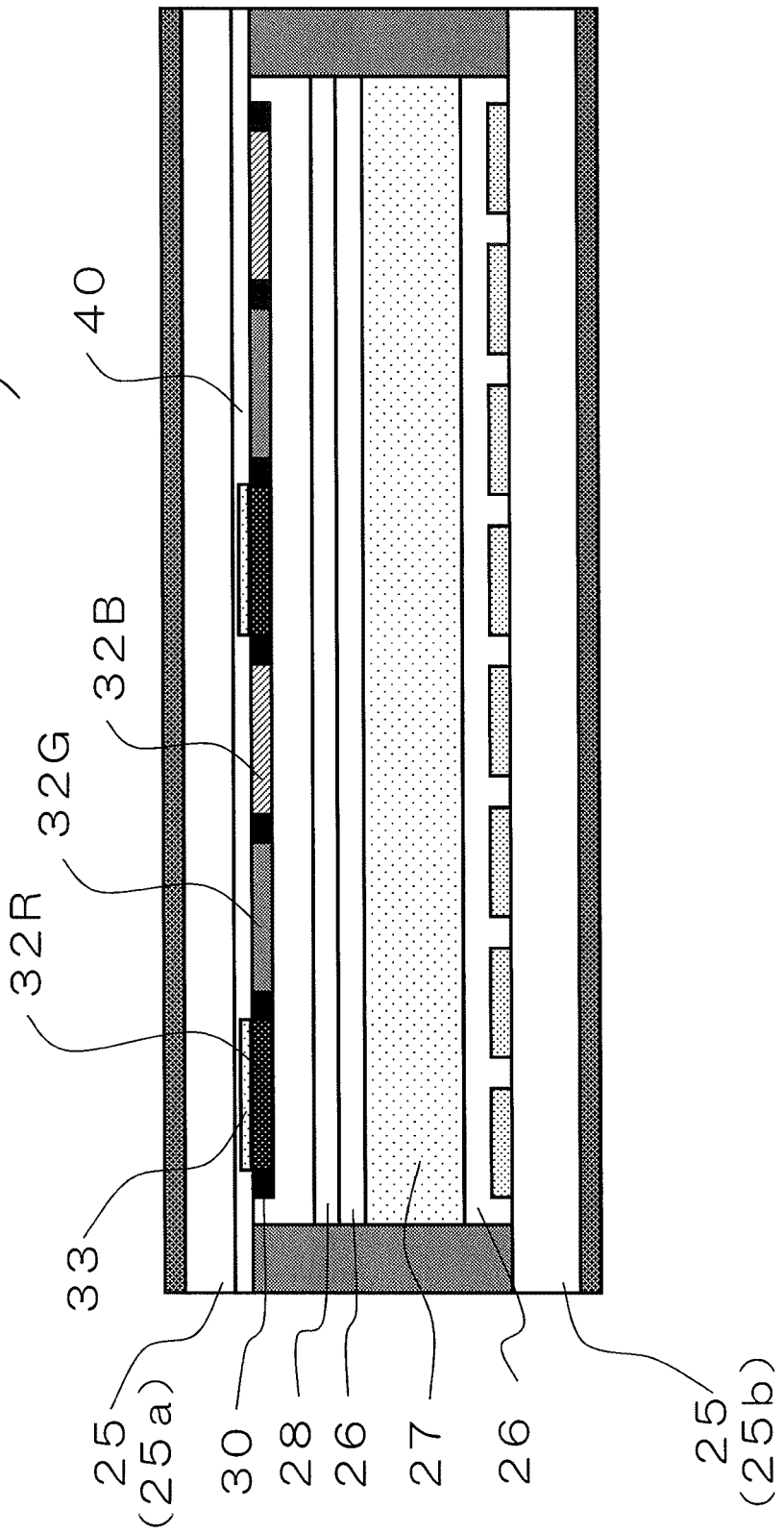
FIG. 3 is a cross-sectional view of a display panel 24.

FIG. 3 is a cross-sectional view of the display panel 24. As shown in FIG. 3, the display panel 24 includes glass substrates 25, orientation films 26, a liquid crystal layer 27, a transparent electrode 28, and a color filter 30. These components are laminated on each other. It should be noted that in a front surface of the color filter 30, regions on which later-described marks 33 are formed are slightly raised as compared to a region on which no mark 33 is formed. In the present embodiment, a flat layer 40 which is formed to be flat at its front side (e.g., an adhesive layer formed from an adhesive) is provided between the glass substrate 25a and the color filter 30 such that a flat surface thereof contacts with a back surface of the glass substrate 25a. It should be noted that the flat layer 40 is not essential.

4. Information Pattern

The details of the color filter 30 on which the information patterns are formed will be described with reference to FIG. 4.

Figure 4:
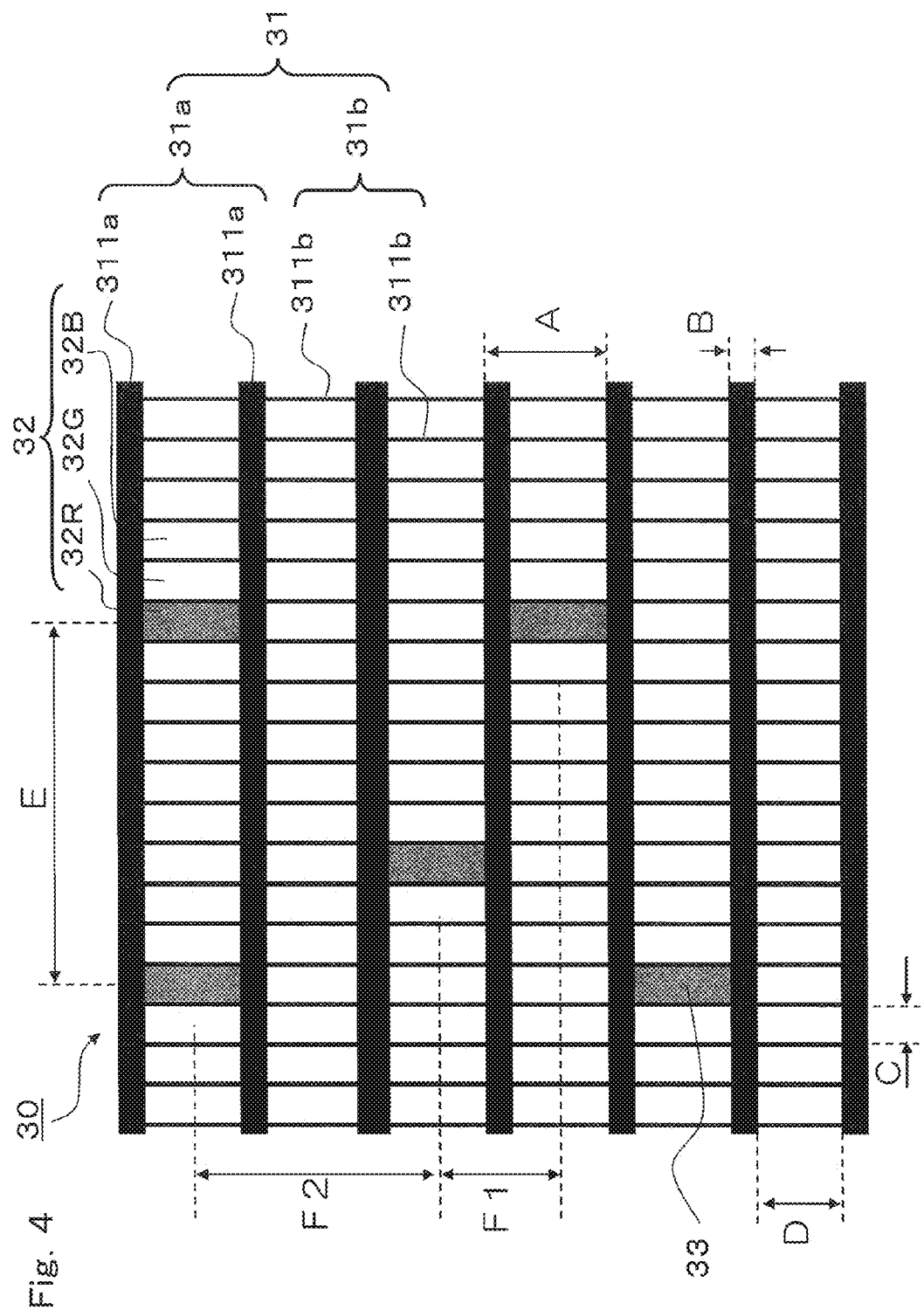
FIG. 4 is a plan view of a color filter 30.

FIG. 4 is a plan view of the color filter 30. The color filter 30 includes a black matrix 31 and a plurality of pixels 32 that transmit red (R) light, green (G) light, and blue (B) light.

[4-1. Black Matrix]

As shown in FIG. 4, the black matrix 31 includes a first black stripe 31a and a second black stripe 31b. The first black stripe 31a is formed of a plurality of black lines 311a extending in a first direction of the display surface 21 (in the lateral direction in FIG. 4). The second black stripe 31b is formed of a plurality of black lines 311b extending in a second direction of the display surface 21 (in the vertical direction in FIG. 4). The black matrix 31 is formed by the first black stripe 31a and the second black stripe 31b crossing each other vertically and laterally. The black matrix 31 is formed from a material containing carbon black as a principal component.

The first black stripe 31a is formed of the plurality of black lines 311a (hereinafter, referred to as "lateral black lines") extending in the lateral direction in FIG. 4. The first black stripe 31a is formed by the plurality of lateral black lines 311a being aligned so as to be spaced apart from each other in the vertical direction. The plurality of lateral black lines 311a are aligned at a determined pitch A. Each lateral black line 311a is formed to have a determined width B.

The second black stripe 31b is formed of the plurality of black lines 311b (hereinafter, referred to as "vertical black lines") extending in the vertical direction in FIG. 4. The second black stripe 31b is formed by the plurality of vertical black lines 311b being aligned so as to be spaced apart from each other in the lateral direction. The plurality of vertical black lines 311b are aligned at a determined pitch (which is a length obtained by adding the width of the vertical black line 311b to a width C of a later-described sub-pixel). Each vertical black line 311b is formed to have a determined width. The width of each vertical black line 311b is smaller than the width of each lateral black line 311a.

[4-2. Pixels]

Each pixel 32 is formed between the adjacent two lateral black lines 311a. In addition, each pixel 32 is formed between the adjacent two vertical black lines 311b. Each pixel 32 is defined by the adjacent two lateral black lines 311a and the adjacent two vertical black lines 311b.

Each pixel 32 is composed of a plurality of sub-pixels. Specifically, each pixel 32 is composed of a sub-pixel 32R, a sub-pixel 32G, and a sub-pixel 32B. The sub-pixel 32R is an example of a first sub-pixel. The sub-pixel 32G is an example of a second sub-pixel. The sub-pixel 32B is an example of a third sub-pixel. The respective sub-pixels 32R, 32G, and 32B are provided in cells (rooms) defined by the black matrix 31. Each pixel 32 includes a plurality of cells.

In the color filter 30, the plurality of pixels 32 are two-dimensionally arranged. Specifically, in the color filter 30, the plurality of pixels 32 are arranged at a determined pitch in the first direction of the display surface 21 (in the lateral direction in FIG. 4) and are arranged at a determined pitch in the second direction of the display surface 21 (in the vertical direction in FIG. 4). The second direction of the display surface 21 is a direction perpendicular to the first direction of the display surface 21.

The sub-pixels 32R, 32G, and 32B correspond to red, green, and blue, respectively. In other words, light that has passed through the sub-pixel 32R is converted to red light, light that has passed through the sub-pixel 32G is converted to green light, and light that has passed through the sub-pixel 32B is converted to blue light.

In the present embodiment, each of the sub-pixels 32R, 32G, and 32B has a rectangular shape having a size with a width C in the lateral direction and a width D in the vertical direction.

[4-3. Marks]

The marks 33 are formed on at least some of the two-dimensionally arranged pixels 32. Each mark 33 is formed on at least one of the sub-pixels 32R, 32G, and 32B. In the present embodiment, each mark 33 is formed on the sub-pixel 32R. Each mark 33 is formed so as to cover the entirety of the sub-pixel 32R. In other words, each mark 33 is formed so as to fill the sub-pixel 32R.

In the present embodiment, each mark 33 is formed only on the sub-pixel 32R. In other words, the marks 33 are formed only on the sub-pixels of the same color.

Although details will be described later, each mark 33 is formed from a material that transmits visible light. However, part of visible light is absorbed by each mark 33. If the marks 33 are formed on sub-pixels of different colors (for example, the marks 33 are formed on the sub-pixels 32R in a certain region, and the marks 33 are formed on the sub-pixels 32B in another region), color unevenness occurs in the display surface 21. However, when the marks 33 are formed on the sub-pixels of the same color as in the present embodiment, it is possible to suppress color unevenness.

It should be noted that the marks 33 may be formed on the sub-pixels 32G and 32B other than red, but are preferably formed on the sub-pixels 32R among the three colors. Green light that has passed through the sub-pixel 32G has a highest brightness among three colors, red, green, and blue. Thus, it is possible to keep the brightness of the entire display surface 21 higher when each mark 33 is formed on the sub-pixel 32R than when each mark 33 is formed on the sub-pixel 32G. In addition, each mark 33 absorbs a more amount of blue light than that of red light. Thus, it is more desirable to form each mark 33 on the sub-pixel 32R than to form each mark 33 on the sub-pixel 32B.

[4-4. Arrangement of Marks]

The plurality of marks 33 are formed within a surface of the color filter 30. The information patterns are formed of the plurality of marks 33. In other words, various information patterns are formed by appropriately setting an arrangement pattern (position and combination) of the plurality of marks 33.

Figure 5:
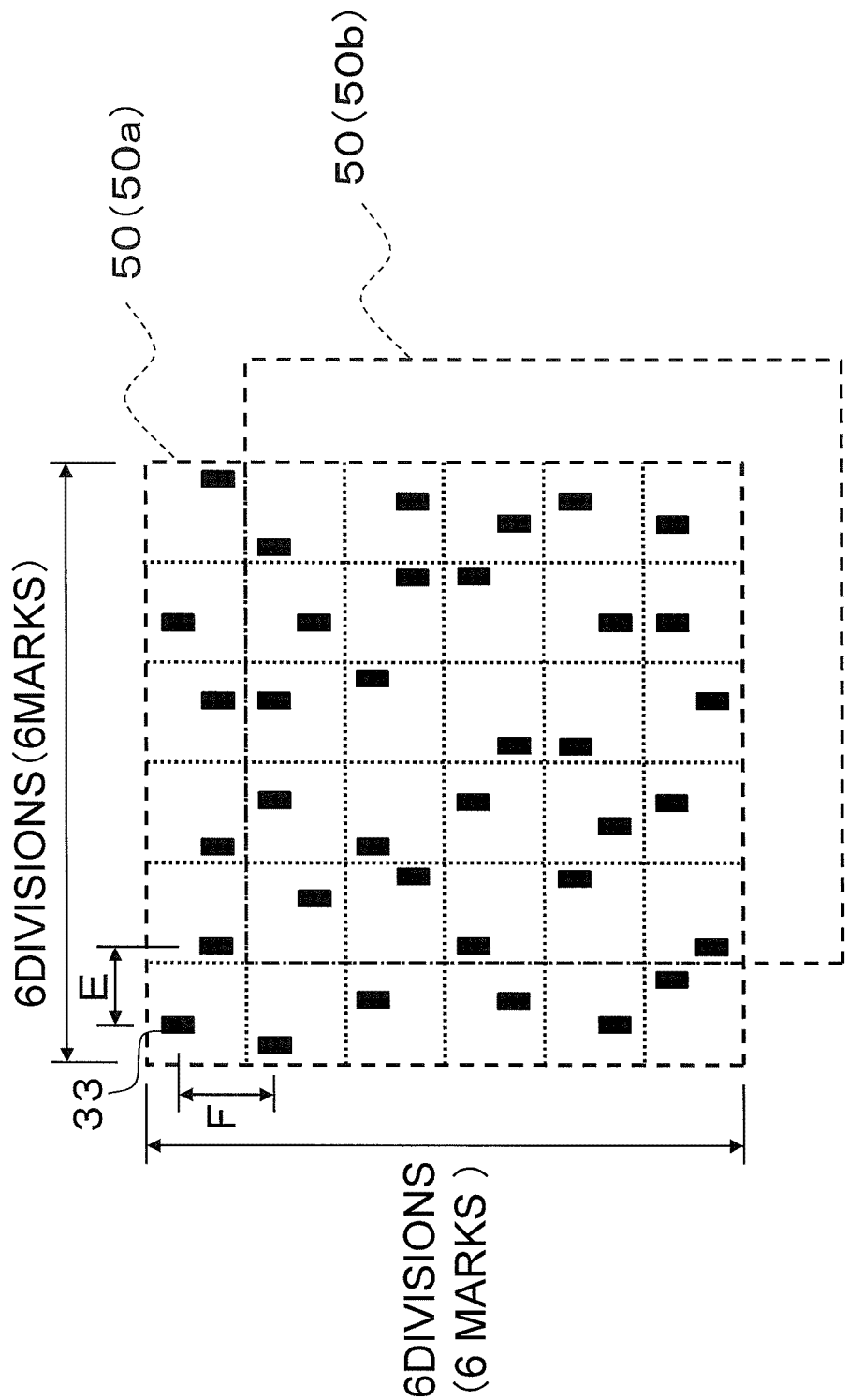
FIG. 5 is a schematic diagram of an information pattern.

FIG. 5 is a schematic diagram of the information pattern. Each information pattern is read by the digital pen 10 with an area of 6 marks×6 marks as a unit area 50. In the unit area 50, 36 marks 33 are arranged. By combining various patterns as arrangement patterns each having 36 marks, it is possible to form a plurality of information patterns that are different from each other depending on a position on the display surface 21. In the present embodiment, the plurality of information patterns are formed over the entirety of the display surface 21. It should be noted that it is only necessary to form information patterns only on a region of the display surface 21 where writing with the digital pen 10 is accepted, and information patterns may be formed only on part of the display surface 21.

Each information pattern represents information regarding a position on the display surface 21 with an area of 6 marks×6 marks as a unit area 50. In FIG. 5, an information pattern of the area 50a represents information regarding the center position of the area 50a, and an information pattern of an area 50b represents information regarding the center position of the area 50b. When the pen tip moves diagonally downward right in FIG. 5, an area 50 read by the digital pen 10 is changed from the area 50a to the area 50b. Since all the information patterns are different from each other depending on a position on the display surface 21, one information pattern is allowed to represent one coordinate (a coordinate on the display surface 21). Since each information pattern and a coordinate on the display surface 21 are associated with each other in a one-to-one relation, the identification section 15 of the digital pen 10 is able to identify the position at which the user performs writing on the display surface 21. The identification section 15 converts position information of the 36 marks 33 in the information pattern to a coordinate on the display surface 21 by using a determined method. As the method for patterning or coordinate conversion of such an information pattern, for example, a publicly known method as disclosed in Japanese Laid-Open Patent Publication No. 2006-141061 may be used.

It should be noted that the area of 6 marks×6 marks is taken as an example of the unit area 50, but the range of the unit area 50 may be set as appropriate in accordance with the design of the digital pen 10 or the display device 20.

[4-5. Distance Between Centers of Marks]

In the present embodiment, the distance E between the centers of the marks 33 adjacent to each other in the lateral direction is larger than each of the width C in the lateral direction and the width D in the vertical direction of each cell defined by the black matrix 31. The distance E indicates the distance between the centers of the marks 33 (the centers of the marks in the lateral direction) in divisions adjacent to each other in the same row (divisions aligned in the lateral direction), among 6 divisions×6 divisions shown in FIG. 5. It should be noted that broken lines indicating the divisions in FIG. 5 are virtual lines. In FIG. 5, a plurality of divisions are defined at a regular pitch. In addition, similarly, the distance F between the centers of the marks 33 adjacent to each other in the vertical direction is equal to or larger than the width D. The distance F indicates the distance between the centers of the marks 33 (the centers of the marks in the vertical direction) in divisions adjacent to each other in the same column (divisions aligned in the vertical direction), among 6 divisions×6 divisions shown in FIG. 5. In other words, in the information pattern, the marks 33 are arranged more roughly than the pattern of the black matrix 31. Hereinafter, the reason why such a configuration is provided will be described.

Each of the black matrix 31 and the marks 33 is formed from a material that absorbs infrared light. Therefore, the infrared light emitted from the irradiation section 11 of the digital pen 10 is absorbed not only by the marks 33 but also by the black matrix 31. In other words, the digital pen 10 reads both the pattern of the black matrix 31 and the information pattern formed of the marks 33.

However, in the present embodiment, the distance E between the centers of the adjacent marks 33 is larger than each of the width C in the lateral direction and the width D in the vertical direction of each of the sub-pixels 32R, 32G, and 32B defined by the black matrix 31. Due to such a configuration, in the case where the resolution of the objective lens 13 is low, a pattern of fine lines such as the black matrix 31 cannot be read, and only the information pattern can be read.

On the other hand, in the case where the resolution of the objective lens 13 is high, the image sensor 14 reads both the pattern of the black matrix 31 and the information pattern. However, in such a case, a Fourier analysis is performed on imaging data (a signal of the read patterns) outputted by the image sensor 14, whereby it is possible to separate a signal regarding the pattern of the black matrix 31 and a signal regarding the information pattern of the marks 33. As a result, it is possible to extract and read only the information pattern of the marks 33.

In addition, as shown in FIGS. 4 and 5, the distance F in the vertical direction between the marks 33 is an integral multiple of the pitch A of the first black stripe 31a. Specifically, in FIG. 4, a distance F1 in the vertical direction between the marks 33 is one time of the pitch A of the first black stripe 31a, and a distance F2 in the vertical direction between the marks 33 is twice the pitch A of the first black stripe 31a.

Although details will be described later, since the information patterns are formed of the regularly arranged marks 33 as described above, a process performed in reading the information pattern is made easy.

[4-6. Sizes of Marks]

The length of the mark 33 in a width direction of the thickest black line (the lateral black lines 311a in the present embodiment) among the black lines 311a and 311b defining the pixel 32 overlapped by the mark 33, is larger than the width of the thickest black line. It should be noted that in the present embodiment, the length, in the width direction, of each mark 33 in the display panel 24 is larger than the width of the thickest black line. Specifically, each mark 33 is formed so as to be larger than the width B of each lateral black line 311a. The length of each mark 33 in the vertical direction is larger than the width B of each lateral black line 311a. Since each mark 33 is formed to have such a size, it is made easy for the digital pen 10 to read the information pattern.

[4-7. Material of Marks]

Each mark 33 is formed from a material that transmits visible light (light having a wavelength of 400 to 700 nm) and absorbs infrared light (light having a wavelength of 700 nm or longer). Each mark 33 is formed from, for example, a material that absorbs infrared light having a wavelength of 800 nm or longer. Specifically, each mark 33 is formed from a material having a transmittance of 90% or higher for visible light and a transmittance of 50% or lower (e.g., 20% or lower) for infrared light. Each of the sub-pixels on which the marks 33 are formed has a lower transmittance for infrared light than those of the sub-pixels on which no mark 33 is formed.

Here, the infrared light emitted from the digital pen 10 is reflected on the reflection surface of the backlight device and the like and reaches the image sensor 14 of the digital pen 10. Of the infrared light that reaches the reflection surface, infrared light that has passed through the sub-pixel on which no mark 33 is formed is higher in intensity than infrared light that has passed through the mark 33. As a result, of the infrared light that reaches the image sensor 14, infrared light that has passed through the sub-pixel on which no mark 33 is formed is higher in intensity than infrared light that has passed through the mark 33. It can be said that each mark 33 decreases the intensity of the light reflected on the above reflection surface. For example, each mark 33 is formed from a material that decreases the intensity of the light reflected on the above reflection surface to almost 10% (e.g., a material that decreases the intensity of the light reflected on the above reflection surface to 20% or lower.

Examples of such materials include diimmonium-based compounds and phthalocyanine-based compounds. These materials may be used singly or may be mixed and used. A diimmonium salt-based compound is preferably included as a diimmonium-based compound. The diimmonium salt-based compound absorbs a large amount of light in the near-infrared range, has a wide range of absorption, and has a high transmittance for light in the visible light range. As the diimmonium salt-based compound, a commercially available product may be used. For example, TZ (manufactured by ADEKA Corporation), CY (manufactured by Nippon Kayaku Co., Ltd.), and the like are preferred.

It should be noted that a wavelength band in which the transmittance in the infrared region is the lowest is different depending on a commercially available product. In such a case, the wavelength of the irradiation section (e.g., a LED) may be selected so as to be matched with the wavelength band in which the transmittance in the infrared region is the lowest. For example, in the case of the marks 33 whose transmittances in the infrared region are the lowest at 950 nm, the wavelength of the infrared light emitted by the irradiation section may be 950 nm.

As described above, the infrared light emitted from the irradiation section 11 of the digital pen 10 is absorbed by the marks 33. Then, almost no infrared light emitted from the irradiation section 11 of the digital pen 10 is reflected on the reflection surface of the backlight device in the region that light having passed through the marks 33 reaches. On the other hand, the infrared light emitted from the digital pen 10 is reflected on the reflection surface in the region that light having passed through the sub-pixels 32G and the sub-pixels 32B reaches. An image of the reflected infrared light is captured by the image sensor 14 of the digital pen 10. For example, when the image captured by the image sensor 14 is displayed on an external display device, the regions in which transmits much of the infrared light is transmitted are displayed in white in the image, and the regions in which the infrared light is absorbed are displayed in black in the image. In other words, the region corresponding to each mark 33 is displayed in black. The digital pen 10 identifies at which position on the display surface 21 the pen tip is present, by reading the pattern of the regions displayed in black.

[4-8. Details of Marks]

The information patterns will be described in further detail with reference to FIG. 6.

In FIG. 6, (a) is a schematic diagram of an infrared image of the color filter 30 on which the marks 33 are formed. In FIG. 6, (b) is an infrared image generated when an information pattern is read by the digital pen 10. In FIG. 6, (c) is a schematic diagram of a visible image of the color filter 30 through which red light, green light, and blue light have passed.

An image of the information pattern shown in (a) of FIG. 6 is captured by the digital pen 10 as shown in (b) of FIG. 6. As shown in (b) of FIG. 6, the digital pen 10 recognizes the lateral black lines 311a and the marks 33 in the information pattern. However, the length of each mark 33 in the width direction of the lateral black lines 311a is larger than the width of each lateral black line 311a. Thus, the digital pen 10 is able to recognize each mark 33 with high accuracy.

In addition, as shown in (c) of FIG. 6, the color filter 30 transmits red light, green light, and blue light, since each mark 33 is formed from a material that transmits visible light. The sub-pixels 32R on which the marks 33 are provided transmit red visible light. Therefore, the display device 20 is allowed to display an image or video in which almost no deterioration due to the marks 33 has occurred.

[4-9. Case where Marks do not Transmit Visible Light]

FIG. 7 is a schematic diagram of a visible image of the color filter 30 having transmitted visible light, in the case where each mark 133 is formed from a material that does not transmit visible light. As shown in FIG. 7, each mark 133 blocks transmission of red light, and thus an image displayed on the display surface 21 comes into a state where color unevenness, brightness unevenness, pixel omission, or the like has occurred. However, in the present embodiment, since each mark 33 is formed from a material that transmits visible light, red light, green light, and blue light are allowed to pass through the color filter 30 as shown in (c) of FIG. 6.

[4-10. Case where Marks are Dots]

Next, the case where an information pattern is formed by using dots 233 formed from a material that does not transmit visible light will be described with reference to FIG. 8.

In FIG. 8, (a) is a schematic diagram of an infrared image of a color filter on which the dots 233 are formed. In FIG. 8, (b) is an infrared image generated when the information pattern is read by the digital pen 10. In FIG. 8, (c) is a schematic diagram of a visible image of the color filter through which red light, green light, and blue light have passed.

As shown in (a) of FIG. 8, on one sub-pixel, a dot 233 smaller than the sub-pixel is formed. An information pattern is formed by a plurality of the dots 233 being arranged. The diameter of each dot 233 is smaller than the width of each lateral black line 311a. Thus, as shown in (c) of FIG. 8, an amount of light, having passed through the pixel on which the dot 233 is formed, which is blocked by the dot 233 is smaller than that in the case of FIG. 6. However, as shown in (b) of FIG. 8, the diameter of each dot 233 is smaller than the width of each lateral black line 311a, and thus it is made difficult for the digital pen 10 to recognize the information pattern. Therefore, the reading accuracy of the digital pen 10 is deteriorated.

Meanwhile, the marks 33 according to the present embodiment have a larger length in the width direction of the lateral black lines 311a than the width of each lateral black line 311a. Thus, the digital pen 10 is able to recognize the marks 33 with high accuracy.

[4-11. Modifications of Marks]

Next, modifications of the marks 33 will be described with reference to FIG. 9.

As shown in (a) of FIG. 9, each mark 33 may be formed over a plurality of sub-pixels, not on a single sub-pixel. Specifically, each mark 33 may be formed on adjacent two sub-pixels. For example, each mark 33 may be formed over the adjacent sub-pixel 32R and sub-pixel 32B.

In addition, as shown in (b) of FIG. 9, each mark 33 may be formed in a round shape having a larger diameter than the width of each lateral black line 311a. In other words, the shape of each mark 33 may not coincide with the shape of the sub-pixel. In the case with such a shape, each mark 33 is preferably arranged at an intermediate position between the two lateral black lines 311a that define the sub-pixel on which the mark 33 is provided. In other words, each mark 33 is preferably arranged with regularity relative to the first black stripe 31a. The reason will be described later. In addition, each mark 33 may be arranged with regularity relative to the second black stripe 31b.

It should be noted that in the present embodiment, the width of each vertical black line 311b is sufficiently smaller than the length of each mark 33 in the width direction of the vertical black line 311b. When the width of each vertical black line 311b is equal to or smaller than the resolution of an optical system included in the digital pen 10, the digital pen 10 cannot detect the vertical black lines 311b (i.e., the second black stripe 31b). Therefore, the vertical black lines 311b do not influence reading of the digital pen 10.

In addition, as shown in (c) of FIG. 9, marks 33 each having a round shape may be formed on the lines of the black matrix 31. In such a case, each mark 33 is preferably arranged such that the center of the mark 33 having a round shape coincides with the center of the lateral black line 311a in the width direction. In other words, each mark 33 is preferably arranged with regularity relative to the first black stripe 31a. It should be noted that marks 33 each having another shape (e.g., a rectangular shape) may be formed on the lines of the black matrix 31.

Moreover, as shown in (d) of FIG. 9, if the length of each mark 33 in the vertical direction is larger than the width of each lateral black line 311a, each mark 33 may be formed on part of the sub-pixel. For example, each mark 33 may be formed so as to cover half of the sub-pixel.

The shape of each mark 33 is not limited to the round shape or the rectangular shape as shown in FIG. 9, and may be a shape such as an elliptical shape or a polygonal shape other than a rectangular shape (e.g., a triangular shape, a pentagonal shape). In addition, each mark 33 is not limited to the figure as shown in FIG. 9, and may be a character or a symbol such as x. In short, each mark 33 may have any shape as long as each mark 33 is capable of being recognized by the digital pen 10.

Next, the reason why each mark 33 is arranged with regularity will be described with reference to FIG. 10.

In FIG. 10, (a) is a schematic diagram showing a state where a black matrix component is removed from an infrared image of the color filter 30 on which the marks 33 are regularly arranged. In addition, in FIG. 10, (b) is a schematic diagram showing a state where a black matrix component is removed from an infrared image of the color filter 30 on which the marks 33 are randomly arranged.

As shown in (a) and (b) of FIG. 10, as a result of removing the black matrix component, portions of the marks 33 (portions that overlap the black lines 311a and 311b) are also removed. However, in the case of (a) of FIG. 10, since the marks 33 are regularly arranged, it is possible to recognize the outer peripheral shape of each mark 33, and it is possible to easily detect the center position of each mark 33. Therefore, the digital pen 10 is able to more accurately read the information pattern.

On the other hand, in the case where the marks 33 are randomly arranged as shown in (b) of FIG. 10, as a result of removing the black matrix component, portions of the marks 33 are also randomly removed. Among the marks 33 whose portions are removed, marks 33 whose center positions are detectable are present, but the shapes of such marks 33 are varied depending on their positions. Thus, it is difficult to detect the center position of each mark 33. In addition, even if the center position of each mark 33 can be detected, the process is delayed.

Therefore, each mark 33 is preferably arranged with regularity relative to the black stripe. "Arranged with regularity relative to the black stripe" includes the distance between the centers of the marks 33 being an integral multiple of the pitch of the black stripe.

5. Configuration of Digital Pen

In FIG. 11, (a) and (b) are schematic configuration diagrams of the digital pen 10. As shown in (a) of FIG. 11, the digital pen 10 includes a pen tip portion 18. The tip of the pen tip portion 18 comes into contact with the display surface 21 when the user performs writing on the display surface 21. The shape of the pen tip portion 18 is preferably such a shape that the user easily recognizes a character or the like displayed on the display surface 21. The objective lens 13 and the irradiation section 11 are provided near the pen tip portion 18. As described above, the infrared light emitted from the irradiation section 11 is partially absorbed by the information pattern provided on the display surface 21 but passes through the region other than the information pattern and is reflected on the above reflection surface. The image sensor 14 is provided on the optical axis of the objective lens 13. The light reflected on the above reflection surface forms an optical image on the imaging surface of the image sensor 14 by the objective lens 13. Thus, an image of the information pattern is captured by the image sensor 14. The transmission section 17 is provided near an end portion at the side opposite to the pen tip portion 18. A power source 19 supplies power to each component of the digital pen 10 that requires power.

In addition, the digital pen 10 includes a pressure sensor 42. The pressure sensor 42 detects a pressure applied from the display device 20 to the pen tip portion 18 when the user writes a character or the like on the display surface 21 by using the digital pen 10. When the pressure sensor 42 detects a pressure, information regarding the pressure (hereinafter, referred to as "pressure information") is sent to the pen-side microcomputer 16. On the basis of the pressure information sent from the pressure sensor 42, the pen-side microcomputer 16 determines whether the user is performing writing with the digital pen 10.

In FIG. 11, (b) shows a modification of the digital pen 10. In (b) of FIG. 11, in the digital pen 10, the objective lens 13 is provided at a portion corresponding to the pen tip of the pen tip portion 18. In addition, a plurality of irradiation sections 11 are provided around the pen tip portion 18 so as to surround the pen tip portion 18. The number of the irradiation sections 11 may be set as appropriate, such as four. It should be noted that a ring-shaped illuminating member (a ring-shaped light) may be provided as the irradiation section 11. In addition, the pen tip portion 18 is preferably formed from a material that is able to transmit the infrared light emitted by the irradiation sections 11.

In the modification shown in (b) of FIG. 11, a lens 43 and the objective lens 13 provided at the portion corresponding to the pen tip constitute an optical system.

In such a case, since the objective lens 13 is provided at the pen tip, the objective lens 13 comes into contact with the display surface 21 when the user writes a character on the display surface 21 by using the digital pen 10. Then, in a state of being in contact with the display surface 21, the objective lens 13 forms an optical image of the information pattern formed on the display surface 21. Due to such a configuration, on the display surface 21, the portion that contacts as the pen tip with the display surface 21 and the portion that reads the information pattern are located in the same region. Thus, the user is allowed to operate the digital pen 10 as if performing an analog handwriting input by using paper and a pen.

6. Operation

Next, flow of a process of the display control system 100 according to the present embodiment will be described with reference to FIG. 12.

When the user starts writing a character or the like by using the digital pen 10, the pen-side microcomputer 16 determines whether a pressure has been applied to the pen tip portion 18 (step S11). When the pressure sensor 42 has detected a pressure (Yes in step S11), the pen-side microcomputer 16 determines that the user is inputting a character on the display surface 21. Next, the reading section 12 of the digital pen 10 reads the information pattern formed on the display surface 21 (step S12). Information (imaging data) regarding the information pattern read by the reading section 12 is sent to the identification section 15. On the basis of the information sent from the reading section 12, the identification section 15 identifies, as position information, the position on the display surface 21 at which the read information pattern is formed (step S13). The identified position information is transmitted from the transmission section 17 to the reception section 22 (step S14). The position information received by the reception section 22 is sent to the display-side microcomputer 23. Then, the display-side microcomputer 23 controls the display panel 24 so as to change display information to be displayed on the display surface 21, in accordance with the received position information (step S15). Then, on the basis of whether the pressure sensor 42 detects a pressure, the pen-side microcomputer 16 monitors whether the pen input by the user has continued (step S16). When the pen input by the user has continued (Yes in step S16), the processing returns to step S12. On the other hand, when the pen input by the user has not continued, the processing ends.

By performing such a process, the display control system 100 is able to detect, with high accuracy, the position at which the user performs a pen input, and reflect the pen input in the display information to be displayed on the display surface 21.

7. Summary

As described above, the display panel 24 (an example of the display section) according to the present embodiment includes a plurality of the black lines 311a and 311b defining a plurality of pixels; and a plurality of the information patterns arranged so as to overlap the display surface 21 and each representing information regarding a position thereof on the display surface 21. Each information pattern is formed by using a plurality of the marks 33 provided so as to overlap the pixels 32, and each mark 33 is formed from a material that transmits visible light and absorbs or diffusely reflects infrared light. The length of each mark 33 in the width direction of the thickest black lines 311a among the black lines 311a and 311b defining the pixel 32 overlapped by the mark 33 is larger than the width of each thickest black line 311a. A plurality of the black lines 311a (an example of black lines) form the first black stripe 31a (an example of the black stripe). The first black stripe 31a is formed at a determined pitch A toward the vertical direction (an example of a determined direction). The first black stripe 31a is formed of the plurality of the lateral black lines 311a (an example of the black lines) aligned toward the vertical direction. It should be noted that the information regarding the position on the display surface 21 is not limited to information with which a position coordinate on the display surface 21 is obtainable through conversion by a determined algorithm, and may be information with which a position coordinate on the display surface 21 is obtainable from a previously prepared table.

Due to such a configuration, the influence of the black lines 311a is reduced, and thus the digital pen 10 is able to read the information pattern with high accuracy.

In addition, in the present embodiment, the distance between the centers of the marks 33 adjacent to each other in the above width direction is an integral multiple of the pitch between the black lines 311a in the width direction.

Due to such a configuration, even when the digital pen 10 reads both the marks 33 and the black stripe 31a, the digital pen 10 is able to easily extract the marks 33 by removing the black stripe component from the read image. As a result, the digital pen 10 is able to read the information pattern with further high accuracy.

In addition, in the present embodiment, as shown in (c) of FIG. 9, each mark 33 may be arranged so as to overlap the black line 311a.

In addition, in the present embodiment, the area of each mark 33 is equal to or larger than the area of each sub-pixel (an example of a cell) of the pixel 32.

In addition, in the present embodiment, as shown in (a) of FIG. 9, each mark 33 may be formed over the adjacent sub-pixels.

In addition, in the present embodiment, each mark 33 is provided so as to overlap only the red sub-pixel 32R in the pixel 32. Due to such a configuration, it is possible to keep the brightness of the entire display surface 21 high.

In addition, the display device 20 according to the present embodiment includes the display panel 24. Since each mark 33 is formed from a material that transmits visible light and absorbs infrared light, the display device 20 is allowed to display an image or a character in which almost no deterioration due to the marks 33 has occurred.

In addition, the display control system 100 according to the present embodiment includes: the display device 20 including the display panel 24 (an example of the display section) in which a plurality of the information patterns each representing information regarding a position thereof on the display surface 21 on which an image is displayed are formed so as to overlap the display surface 21; and the digital pen 10 (an example of the reading device) that reads the information pattern. The digital pen 10 includes: the reading section 12 that optically reads the information pattern; and the transmission section 17 that transmits, to the display device 20, transmission data that is based on information regarding the information pattern read by the reading section 12. In addition to the display panel 24, the display device 20 includes: the reception section 22 that receives the transmission data from the transmission section 17; and the display-side microcomputer 23 (an example of a display control section) that controls the display panel 24 such that a display image on the display surface 21 is changed on the basis of the transmission data. The display panel 24 has a plurality of the black lines 311a and 311b defining a plurality of the pixels 32 for forming the display image. Each information pattern is formed by using a plurality of the marks 33 provided so as to overlap the pixels 32. Each mark 33 is formed form a material that transmits visible light and absorbs or diffusely reflects infrared light. The length of each mark 33 in the width direction of the thickest lateral black lines 311a among the black lines 311a and 311b defining the pixel 32 overlapped by the mark 33 is larger than the width of each lateral black line 311a. It should be noted that in the present embodiment, the transmission data that is based on the information regarding the information pattern is position information identified on the basis of imaging data, but may be information regarding the information pattern itself as will be described in Embodiment 2.

Due to such a configuration, it is possible to realize a system having higher accuracy of reading by the digital pen 10 than in the conventional art. Thus, the user is allowed to comfortably use a handwriting input.

Embodiment 2

In Embodiment 1 described above, the configuration has been described in which the digital pen 10 performs the process for identifying a position on the display surface 21. In contrast, in a display control system 200 (display control apparatus) according to the present embodiment, a display device 220 performs the process for identifying a position on the display surface 21. In other words, an identification section 125 corresponding to the identification section 15 according to Embodiment 1 is provided in the display device 220. Hereinafter, the display control system 200 will be described.

It should be noted that the description of components that are substantially the same as those in Embodiment 1 will be omitted in some cases. In addition, in FIG. 13 for describing the present embodiment, the components that are substantially the same as those in Embodiment 1 are designated by the same reference characters. It should be noted that the information patterns shown in FIG. 4 are formed in a display panel 24 according to the present embodiment.

As shown in FIG. 13, the display device 220 includes the display panel 24, a reception section 22, the identification section 125, a display-side microcomputer 23, and a backlight device (not shown). The display panel 24 has a display surface 21. A plurality of information patterns that are different depending on a position on the display surface 21 are previously formed on the display surface 21. The reception section 22 receives information (later-described information regarding the information pattern) transmitted from a digital pen 210. On the basis of the information received by the reception section 22, the identification section 125 identifies, as position information, the position on the display surface 21 at which the information pattern read by the digital pen 210 is formed. The display-side microcomputer 23 controls the display panel 24 so as to change display information to be displayed on the display surface 21, on the basis of the identified position information.

Meanwhile, the digital pen 210 includes an irradiation section 11, a reading section 12, a pen-side microcomputer 16, and a transmission section 17. The reading section 12 optically reads the information pattern. The transmission section 17 transmits, to the display device 220, information regarding the information pattern read by the reading section 12 (e.g., imaging data outputted by an image sensor 14).

Next, flow of a process of the display control system 200 according to the present embodiment will be described with reference to FIG. 14.

When the user starts writing a character by using the digital pen 210, the pen-side microcomputer 16 determines whether a pressure has been applied to the pen tip portion 18 (step S21). When a pressure sensor 42 has detected a pressure (Yes in step S21), the pen-side microcomputer 16 determines that the user is inputting a character on the display surface 21. Next, the reading section 12 of the digital pen 210 reads the information pattern formed on the display surface 21 (step S22). Information regarding the information pattern read by the reading section 12 is transmitted from the transmission section 17 to the reception section 22 (step S23). The information received by the reception section 22 is sent to the identification section 125. On the basis of the sent information, the identification section 125 identifies the position on the display surface 21 at which the read information pattern is formed (step S24). Information representing the position on the display surface 21 that is identified by the identification section 125 is sent to the display-side microcomputer 23. Then, the display-side microcomputer 23 controls the display panel 24 so as to change display information to be displayed on the display surface 21, in accordance with the received information representing the position on the display surface 21 (step S25). Then, on the basis of whether the pressure sensor 42 detects a pressure, the display-side microcomputer 23 monitors whether the pen input by the user has continued (step S26). When the pen input by the user has continued (Yes in step S26), the processing returns to step S22. On the other hand, when the pen input by the user has not continued, the processing ends.

By performing such a process, the display control system 200 is able to detect, with high accuracy, the position at which the user performs a pen input, and reflect the pen input in the display information to be displayed on the display surface 21.

Other Embodiments

As described above, Embodiments 1 and 2 have been described as an illustrative example of the technology disclosed in the present application. However, the technology in the present disclosure is not limited thereto, and is also applicable to embodiments in which changes, substitutions, additions, omissions, and/or the like are made as appropriate. In addition, each constituent element described in the above Embodiments 1 and 2 may be combined to provide a new embodiment.

Other embodiments will be described below.

In the above-described embodiments, each mark 33 is formed from a material that transmits visible light and absorbs infrared light, but the present invention is not limited thereto. Each mark 33 may be formed from a material that transmits visible light and diffusely reflects infrared light.

In the case where each mark 33 is formed from a material that specularly reflects infrared light, emitted light is specularly reflected and may not return to the image sensor 14. In this case, the position of each mark 33 cannot be recognized. However, in the case where each mark 33 is formed from a material that diffusely reflect infrared light, emitted light is diffusedly reflected, and thus part of the emitted light surely reaches the image sensor 14. As a result, it is possible for the digital pen 10 to recognize reflected light from the marks 33. It should be noted that when an image captured by the image sensor 14 is displayed on an external display device, the regions in which the marks 33 are formed are displayed in whiter in the image than the sub-pixels in which no mark 33 is formed.

In addition, in the above-described embodiments, each mark 333 may be divided into a plurality of portions. For example, as shown in FIG. 17, a plurality of band-shaped portions constituting a stripe may be formed as a single mark 333. Each band-shaped portion is formed from a material that is the same as that of the marks 33. The length of each mark 333 in the width direction of the thickest black lines 311a among the black lines defining the pixel overlapped by the mark 333 is larger than the width of each thickest black line 311a. In this case, the length of each band-shaped portion in the width direction may be shorter than the width of each black line 311a. In the case where the interval between the adjacent band-shaped portions is smaller than the width of each band-shaped portion, each mark 333 composed of the plurality of band-shaped portions is recognized as a single region in the image sensor 14. Thus, it is possible to obtain information regarding a position on the display surface 21 from position information of each mark 333.

In addition, in the above-described embodiments, the marks 33 (the information patterns) are formed on the color filter 30. However, the marks 33 may be formed at a position that light applied from the outside to the display panel 24 reaches, and the member on which the marks 33 are formed is not limited to the color filter 30. As shown in FIG. 15, the marks 33 (the information patterns) may be formed on a protective sheet 60. In addition, as shown in FIG. 16, a sheet 70 on which the marks 33 (the information patterns) are formed may be added. In FIG. 16, the sheet 70 is laminated between the protective sheet 60 and the glass substrate 25a at the front side, but may be laminated at another position. For example, the sheet 70 may be laminated between a polarizing plate (not shown) and the glass substrate 25a at the front side or on the glass substrate 25b at the back side.

In addition, in the above-described embodiments, a rectangular shape is taken as an example of the shape of each sub-pixel, but the present disclosure is not limited thereto. The shape of each sub-pixel may be a shape such as a triangular shape or a parallelogram shape, or sub-pixels having these shapes may be used in combination. The shape of each sub-pixel may be any shape as long as the display device 20 is able to output a character or video. In addition, the black matrix 31 may also be changed as appropriate according to the shape of each sub-pixel.

In addition, in the above-described embodiments, the pixels 32 each composed of sub-pixels of three colors are taken as an example, but the present disclosure is not limited thereto. Each pixel 32 may be composed of sub-pixels of four or more colors. For examples, each pixel 32 may be composed of sub-pixels of four colors, red, green, blue, and white.

In addition, in the above-described embodiments, each pixel is composed of a plurality of sub-pixels, but the present disclosure is not limited thereto. For example, one pixel may be composed of one sub-pixel.

In addition, in the above-described embodiments, the lateral black lines 311a are thicker than the vertical black lines 311b, but the vertical black lines 311b may be thicker than the lateral black lines 311a. In this case, the length of each mark 33 in the width direction of the vertical black lines 311b is made longer than the width of each vertical black line 311b. In addition, the thickness of each vertical black line 311b may be the same as that of each lateral black line 311a.

In the above-described embodiments, the liquid crystal display is taken as an example of the display device 20, but the present disclosure is not limited thereto. The display device may be a device capable of displaying characters or video, such as a plasma display panel, an organic EL display panel, or an inorganic EL display panel. In addition, the display device may be a device whose display surface is freely deformed, such as electronic paper.

The digital pen 10 may be used not only for a character input but also as means for moving a cursor like a mouse. Thus, it is possible to operate a graphical user interface (GUI) by using the digital pen 10. Accordingly, the digital pen 10 or the display device 20 may include a switching section that switches a mode of the digital pen 10 between a pen input mode and a cursor operation mode. In addition, when switches corresponding to a right click and a left click of a mouse, respectively, are provided in the digital pen 10 or the display device 20, it is possible to further improve the operability of the GUI.

The pressure sensor 42 that detects the pressure of the pen tip may be a sensor that detects not only presence/absence of a pressure but also a continuous change in pressure. In this case, the display panel 24 may be controlled so as to change the thickness and the color depth of a line to be displayed, in accordance with a pressure detected while a character is written.

As presented above, the embodiments have been described as an example of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A display device having a display surface on which an image is displayed, the display device comprising:
    a plurality of black lines defining a plurality of pixels for forming a display image to be displayed on the display surface, each of the plurality of black lines absorbs infrared light;
    a plurality of information patterns arranged so as to overlap the display surface, each of the plurality of information patterns indicating a position thereof on the display surface, wherein
    each information pattern is formed by using a plurality of marks provided so as to overlap the pixels,
    each mark is formed from a material that transmits visible light and absorbs or diffusedly reflects infrared light,
    the plurality of black lines including first lines extending in a first direction and second lines extending in a second direction, the first direction being perpendicular to the second direction, and each mark having a first length in the first direction and a second length in the second direction, where the first length and the second length of each mark is larger than a width of the thickest black line among the plurality of black lines defining the plurality of pixels.

2. The display device according to claim 1, wherein a distance between centers of the marks adjacent to each other in the width direction is an integral multiple of a pitch between the black lines in the width direction.

3. The display device according to claim 1, wherein each mark is arranged so as to overlap the black line.

4. The display device according to claim 1, wherein each pixel includes one or a plurality of cells, and an area of each mark is equal to or larger than an area of each cell.

5. The display device according to claim 4, wherein each mark is formed over the adjacent cells.

6. The display device according to claim 1, wherein each pixel includes a red sub-pixel, a green sub-pixel, and a blue sub-pixel, and each mark is provided so as to overlap only the red sub-pixel in the pixel.

7. A display control system comprising:

a display device including a display section in which a plurality of information patterns each indicating a position thereof on a display surface on which an image is displayed are formed so as to overlap the display surface; and a reading device configured to read the information pattern, wherein the reading device includes: a reading section configured to optically read the information pattern; and a transmission section configured to transmit, to the display device, transmission data that is based on information regarding the information pattern read by the reading section, the display device includes: a reception section configured to receive the transmission data from the transmission section; and a display control section configured to control the display section such that a display image on the display surface is changed on the basis of the transmission data, the display device has a plurality of black lines defining a plurality of pixels for forming the display image, each of the plurality of black lines absorbs infrared light, each information pattern is formed by using a plurality of marks provided so as to overlap the pixels, each mark is formed from a material that transmits visible light and absorbs or diffusedly reflects infrared light, the plurality of black lines including first lines extending in a first direction and second lines extending in a second direction, the first direction being perpendicular to the second direction, and each mark having a first length in the first direction and a second length in the second direction, where the first length and the second length of each mark is larger than a width of the thickest black line among the plurality of black lines defining the plurality of pixels.

8. The display device according to claim 1, wherein the each mark is individually wider than the black lines.

9. The display device according to claim 1, wherein the information pattern is formed on a sheet laminated at the display device.

10. The display device according to claim 1, wherein shape of the each mark is a round shape or polygonal shape.

11. The display control system according to claim 7, wherein the each mark is individually wider than the black lines.

12. The display control system according to claim 7, wherein the information pattern is formed on a sheet laminated at the display device.

13. The display control system according to claim 7, wherein shape of the each mark is a round shape or polygonal shape.

* * * * *